(12) United States Patent
Kabalnov et al.

(10) Patent No.: US 11,643,565 B2
(45) Date of Patent: May 9, 2023

(54) THREE-DIMENSIONAL PRINTING COMPOSITIONS

(71) Applicant: HEWLETT-PACKARD DEVELOPMENT COMPANY, L.P., Spring, TX (US)

(72) Inventors: Alexey S Kabalnov, San Diego, CA (US); Stephen G Rudisill, San Diego, CA (US); Jesiska Tandy, San Diego, CA (US); Graciela Emma Negri Jimenez, San Diego, CA (US); Shannon Reuben Woodruff, San Diego, CA (US); Jason Butler, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 163 days.

(21) Appl. No.: 16/605,317

(22) PCT Filed: Feb. 6, 2018

(86) PCT No.: PCT/US2018/017113
§ 371 (c)(1),
(2) Date: Oct. 15, 2019

(87) PCT Pub. No.: WO2019/156656
PCT Pub. Date: Aug. 15, 2019

(65) Prior Publication Data
US 2021/0301163 A1 Sep. 30, 2021

(51) Int. Cl.
| | | |
|---|---|---|
| *C09D 11/322* | (2014.01) | |
| *B33Y 10/00* | (2015.01) | |
| *B29C 64/165* | (2017.01) | |
| *B33Y 70/10* | (2020.01) | |
| *C09D 11/037* | (2014.01) | |
| *C09D 11/10* | (2014.01) | |
| *C09D 11/324* | (2014.01) | |
| *C09D 11/38* | (2014.01) | |
| *B29K 105/00* | (2006.01) | |
| *B29K 509/02* | (2006.01) | |
| *B29K 509/08* | (2006.01) | |

(52) U.S. Cl.
CPC .......... *C09D 11/322* (2013.01); *B29C 64/165* (2017.08); *B33Y 10/00* (2014.12); *B33Y 70/10* (2020.01); *C09D 11/037* (2013.01); *C09D 11/10* (2013.01); *C09D 11/324* (2013.01); *C09D 11/38* (2013.01); *B29K 2105/0005* (2013.01); *B29K 2509/02* (2013.01); *B29K 2509/08* (2013.01); *B29K 2995/0021* (2013.01)

(58) Field of Classification Search
CPC ..... C09D 11/322; C09D 11/037; C09D 11/10; C09D 11/324; C09D 11/38; C09D 11/328; C09D 11/40; B29C 64/165; B33Y 10/00; B33Y 70/10; B33Y 70/00; B29K 2105/0005; B29K 2509/02; B29K 2509/08; B29K 2995/0021
See application file for complete search history.

(56) References Cited

U.S. PATENT DOCUMENTS

| | | |
|---|---|---|
| 5,204,055 A | 4/1993 | Sachs et al. |
| 7,972,426 B2 | 7/2011 | Hinch et al. |
| 8,651,390 B2 | 2/2014 | Hinch et al. |
| 9,643,359 B2 | 5/2017 | Baumann et al. |
| 2004/0137228 A1 | 7/2004 | Monsheimer et al. |
| 2007/0238056 A1 | 10/2007 | Baumann et al. |
| 2008/0187711 A1 | 8/2008 | Alam et al. |
| 2010/0304028 A1* | 12/2010 | Sowinski ............ C09D 11/322 427/256 |
| 2014/0079841 A1 | 3/2014 | Pridoehl et al. |

FOREIGN PATENT DOCUMENTS

| | | |
|---|---|---|
| WO | WO2007114895 A2 | 10/2007 |
| WO | WO 2016/171724 | * 10/2016 |
| WO | WO 2016/175748 | * 11/2016 |
| WO | WO 2017/014784 | * 1/2017 |
| WO | WO2017069778 A1 | 4/2017 |
| WO | WO 2017/188965 | * 11/2017 |
| WO | WO2017188965 A1 | 11/2017 |

OTHER PUBLICATIONS

Faraday, Michael. "X. The Bakerian Lecture.—Experimental relations of gold (and other metals) to light." Philosophical Transactions of the Royal Society of London 147 (1857): 145-181.
Garcia, Guillermo, et al. "Dynamically modulating the surface plasmon resonance of doped semiconductor nanocrystals." Nano letters 11.10 (2011): 4415-4420.
Gross, Bethany C., et al. "Evaluation of 3D printing and its potential impact on biotechnology and the chemical sciences." (2014): 3240-3253.
Kanehara, Masayuki, et al. "Indium tin oxide nanoparticles with compositionally tunable surface plasmon . . . " Jrnl of the Amer Chem Society 131.49, 200,: 17736-17737.
Milligan, W. O., and R. H. Morriss. "Morphology of Colloidal Gold—A Comparative Study." Journal of the American Chemical Society 86.17 (1964): 3461-3467.

(Continued)

*Primary Examiner* — Doris L Lee
(74) *Attorney, Agent, or Firm* — HP Inc. Patent Department

(57) ABSTRACT

Disclosed herein are compositions for three-dimensional printing. In an example, disclosed herein is a composition for three-dimensional printing comprising: (A) a powder build material; (B) a first fusing agent; (C) a second fusing agent different from the first fusing agent; (D) a detailing agent; (E) a cyan ink composition; (F) a yellow ink composition; (G) a magenta ink composition; and (H) a black ink composition.

11 Claims, 3 Drawing Sheets

(56) References Cited

OTHER PUBLICATIONS

Usui, Hiroyuki, Takeshi Sasaki, and Naoto Koshizaki. "Optical transmittance of indium tin oxide nanoparticles prepared by laser-induced fragmentation in water." The Journal of Physical Chemistry B 110.26 (2006): 12890-12895.

Van der Zande, Bianca MI, et al. "Aqueous gold sols of rod-shaped particles." The Journal of Physical Chemistry B 101.6 (1997): 852-854.

Weiser, H., et al., "Von Weimark'S Precipitation Theory and the Formation of Colloidal Gold", 10 pages, The Rice Institute, Houston, TX.

* cited by examiner

THREE-DIMENSIONAL PRINTING COMPOSITIONS

BACKGROUND

Three-dimensional (3D) printing may be an additive printing process used to make three-dimensional solid parts from a digital model. 3D printing is often used in rapid product prototyping, mold generation, and mold master generation. Some 3D printing techniques are considered additive processes because they involve the application of successive layers of material. This is unlike traditional machining processes, which often rely upon the removal of material to create the final part. Materials used in 3D printing often include curing or fusing, which for some materials may be accomplished using heat-assisted extrusion or sintering, and for other materials may be accomplished using digital light projection technology.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Figure 1:
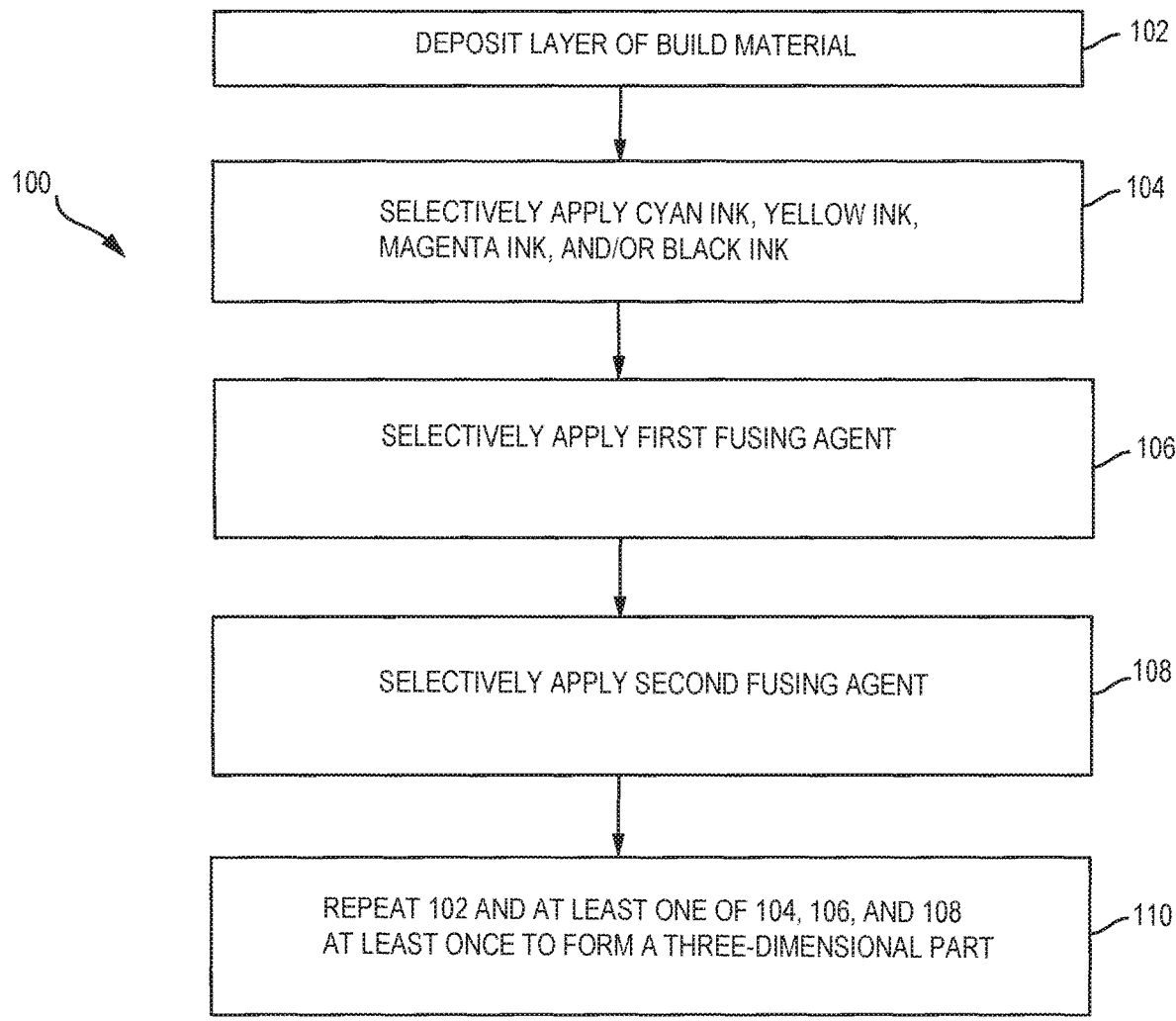
FIGS. 1 and 2 are flow diagrams illustrating examples of a 3D printing methods according to the present disclosure.

The present disclosure refers herein to three-dimensional printing compositions and methods.

In one example, described is a composition for three-dimensional printing comprising: (A) a powder build material; (B) a first fusing agent; (C) a second fusing agent different from the first fusing agent; (D) a detailing agent; (E) a cyan ink composition; (F) a yellow ink composition; (G) a magenta ink composition; and (H) a black ink composition.

In some examples, the powder build material is selected from the group consisting of polymeric powder, polymeric-ceramic composite powder, and combinations thereof.

In some examples, the first fusing agent comprises at least one nanoparticle, wherein the nanoparticle comprises at least one metal oxide, which absorbs infrared light in a range of from about 780 nm to about 2300 nm and is shown in formula (1):

$$M_m M'O_n \quad (1)$$

wherein M is an alkali metal, m is greater than 0 and less than 1, M' is any metal, and n is greater than 0 and less than or equal to 4; and wherein the nanoparticle has a diameter of from about 0.1 nm to about 500 nm.

In some examples, the powder build material comprises fillers selected from the group consisting of silica, alumina, glass, and combinations thereof.

In some examples, the second fusing agent comprises a near infrared absorbing compound.

In some examples, the near infrared absorbing compound is selected from the group consisting of carbon black, oxonol, squarylium, chalcogenopyrylarylidene, bis(chalcogenopyrylo)polymethine, bis(aminoaryl)polymethine, merocyanine, trinuclear cyanine, indene-crosslinked polymethine, oxyindolidine, iron complexes, quinoids, nickel-dithiolene complex, cyanine dyes, and combinations thereof.

In some examples, the near infrared absorbing compound is carbon black.

In some examples, the second fusing agent further comprises: at least one co-solvent; at least one surfactant; at least one anti-kogation agent; at least one chelating agent; at least one buffer solution; at least one biocide; and water.

In some examples, M is cesium (Cs), m is 0.33, M' is tungsten (W), and n is greater than 0 and less than or equal to 3.

In some examples, the detailing agent comprises: at least one co-solvent; at least one surfactant; at least one anti-kogation agent; at least one chelating agent; at least one biocide; and water.

In an example, disclosed is a composition for three-dimensional part made from three-dimensional printing, the composition comprising: (A) a powder build material, wherein the powder build material is selected from the group consisting of polymeric powder, polymeric-ceramic composite powder, and combinations thereof; (B) a first fusing agent comprising at least one nanoparticle, wherein the nanoparticle comprises at least one metal oxide, which absorbs infrared light in a range of from about 780 nm to about 2300 nm and is shown in formula (1):

$$M_m M'O_n \quad (1)$$

wherein M is cesium (Cs), m is 0.33, M' is tungsten (W), and n is greater than 0 and less than or equal to 3; and wherein the nanoparticle has a diameter of from about 0.1 nm to about 500 nm; (C) a second fusing agent comprising at least one near infrared absorbing compound, wherein the near infrared absorbing compound is selected from the group consisting of carbon black, oxonol, squarylium, chalcogenopyrylarylidene, bis(chalcogenopyrylo)polymethine, bis(aminoaryl)polymethine, merocyanine, trinuclear cyanine, indene-crosslinked polymethine, oxyindolidine, iron complexes, quinoids, nickel-dithiolene complex, cyanine dyes, and combinations thereof; (D) a detailing agent; (E) a cyan ink composition; (F) a yellow ink composition; (G) a magenta ink composition; and (H) a black ink composition.

In some examples, the first fusing agent further comprises: at least one co-solvent; at least one anti-kogation agent; at least one surfactant; at least one biocide; at least one pigment stabilizer; at least one complexing agent; and water.

In some examples, the detailing agent comprises: at least one co-solvent; at least one surfactant; at least one anti-kogation agent; at least one chelating agent; at least one biocide; and water.

In some examples, disclosed is a method of using the composition described above, the method comprising: adding the composition described above to a three-dimensional printer; and printing a three-dimensional part.

In some examples, (E) the cyan ink composition comprises: at least one cyan colorant, at least one co-solvent, at least one anti-kogation agent, at least one buffer solution, at least one surfactant, at least one biocide, at least one chelating agent, and water.

In some examples, (F) the yellow ink composition comprises: at least one yellow colorant, at least one co-solvent, at least one anti-kogation agent, at least one buffer solution, at least one surfactant, at least one biocide, at least one chelating agent, and water.

In some examples, (G) the magenta ink composition comprises: at least one magenta colorant, at least one co-solvent, at least one anti-kogation agent, at least one buffer solution, at least one surfactant, at least one biocide, at least one chelating agent, and water.

In some examples, (H) the black ink composition comprises: at least one black colorant, at least one co-solvent, at least one anti-kogation agent, at least one buffer solution, at least one surfactant, at least one biocide, at least one chelating agent, and water.

In some examples, the near infrared absorbing compound is carbon black.

In another example, disclosed is a method for three-dimensional printing comprising: (A) depositing a layer of build material, wherein the build material is selected from the group consisting of polymeric powder, polymeric-ceramic composite powder, and combinations thereof; and then carrying out at least one of the following: (B) selectively applying: a cyan ink composition, a yellow ink composition, a magenta ink composition, and/or a black ink composition on the build material; (C) selectively applying a first fusing agent on the build material, wherein the first fusing agent comprises at least one nanoparticle, wherein the nanoparticle comprises at least one metal oxide, which absorbs infrared light in a range of from about 780 nm to about 2300 nm and is shown in formula (1):

$$M_mM'O_n \qquad (1)$$

wherein M is an alkali metal, m is greater than 0 and less than 1, M' is any metal, and n is greater than 0 and less than or equal to 4; and wherein the nanoparticle has a diameter of from about 0.1 nm to about 500 nm; (D) selectively applying a second fusing agent on the build material, wherein the second fusing agent comprises at least one near infrared absorbing compound; (E) repeating (A) and at least one of (B), (C), and (D) at least once to form a three-dimensional part.

In some examples, the powder build material comprises fillers selected from the group consisting of silica, alumina, glass, and combinations thereof.

In some examples, the method described above further comprises: (E) selectively applying a detailing agent on the build material.

In some examples, the detailing agent comprises water in an amount of at least 70 wt % based on the total weight of the detailing agent.

In some examples, the near infrared absorbing compound is selected from the group consisting of carbon black, oxonol, squarylium, chalcogenopyrylarylidene, bis(chalcogenopyrylo)polymethine, bis(aminoaryl)polymethine, merocyanine, trinuclear cyanine, indene-crosslinked polymethine, oxyindolidine, iron complexes, quinoids, nickel-dithiolene complex, cyanine dyes, and combinations thereof.

In some examples, the near infrared absorbing compound is carbon black.

In some examples, the second fusing agent further comprises: at least one co-solvent; at least one surfactant; at least one anti-kogation agent; at least one chelating agent; at least one buffer solution; at least one biocide; and water.

In some examples, M is cesium (Cs), m is 0.33, M' is tungsten (W), and n is greater than 0 and less than or equal to 3.

In some examples, the detailing agent further comprises: at least one co-solvent; at least one surfactant; at least one anti-kogation agent; at least one chelating agent; and at least one biocide.

In some examples, after (A), (B), (C), and (D) are all carried out and then (E) comprises repeating (A), (B), (C), and (D) at least once to form the three-dimensional part.

In another example, disclosed is a method of forming a three-dimensional part comprising: (A) depositing a layer of build material, wherein the build material is selected from the group consisting of polymeric powder, polymer-ceramic composite powder, and combinations thereof; (B) selectively applying: a cyan ink composition, a yellow ink composition, a magenta ink composition, and/or a black ink composition on the build material; (C) selectively applying a first fusing agent on the build material, wherein the first fusing agent comprises at least one nanoparticle, wherein the nanoparticle comprises at least one metal oxide, which absorbs infrared light in a range of from about 780 nm to about 2300 nm and is shown in formula (1):

$$M_mM'O_n \qquad (1)$$

wherein M is an alkali metal, m is greater than 0 and less than 1, M' is any metal, and n is greater than 0 and less than or equal to 4; and wherein the nanoparticle has a diameter of from about 0.1 nm to about 500 nm; (D) selectively applying a second fusing agent on the build material, wherein the second fusing agent comprises at least one near infrared absorbing compound; (E) selectively applying a detailing agent on the build material; and (F) repeating (A), (B), (C), (D), and (E) at least once to form the three-dimensional part.

In some examples, the first fusing agent further comprises: at least one co-solvent; at least one anti-kogation agent; at least one surfactant; at least one biocide; at least one pigment stabilizer; at least one complexing agent; and water.

In some examples, the detailing agent comprises: at least one co-solvent; at least one surfactant; at least one anti-kogation agent; at least one chelating agent; at least one biocide; and water.

In some examples, the near infrared absorbing compound is selected from the group consisting of carbon black, oxonol, squarylium, chalcogenopyrylarylidene, bis(chalcogenopyrylo)polymethine, bis(aminoaryl)polymethine, merocyanine, trinuclear cyanine, indene-crosslinked polymethine, oxyindolidine, iron complexes, quinoids, nickel-dithiolene complex, cyanine dyes, and combinations thereof.

In some examples, the cyan ink composition comprises: at least one cyan colorant, at least one co-solvent, at least one anti-kogation agent, at least one buffer solution, at least one surfactant, at least one biocide, at least one chelating agent, and water.

In some examples, the yellow ink composition comprises: at least one yellow colorant, at least one co-solvent, at least one anti-kogation agent, at least one buffer solution, at least one surfactant, at least one biocide, at least one chelating agent, and water.

In some examples, the magenta ink composition comprises: at least one magenta colorant, at least one co-solvent, at least one anti-kogation agent, at least one buffer solution, at least one surfactant, at least one biocide, at least one chelating agent, and water.

In some examples, the black ink composition comprises: at least one black colorant, at least one co-solvent, at least one anti-kogation agent, at least one buffer solution, at least one surfactant, at least one biocide, at least one chelating agent, and water.

In some examples, the near infrared absorbing compound is carbon black.

Examples of the three-dimensional (3D) printing methods and compositions disclosed herein can include exposing an entire layer of a build material (also referred to as build material particles) to radiation and fusing/hardening a selected region (in some instances less than the entire layer) of the build material to become a layer of a 3D part (or 3D object or article). A fusing agent can selectively be deposited in contact with the selected region of the build material. The fusing agent can be capable of penetrating into the layer of the build material and spreading onto the exterior surface of the build material. This fusing agent can be capable of absorbing radiation and converting the absorbed radiation to thermal energy, which in turn melts or sinters the build material that is in contact with the second fusing agent. This causes the build material to fuse, bind, cure, etc. to form the layer of the 3D part (or 3D object or article). The fusing agents used in multi jet fusion tend to have significant absorption (e.g., 80%) in the visible region (400 nm-780 nm).

The three-dimensional printing compositions and methods disclosed herein can use two different fusing agents: a low tint fusing agent (first fusing agent) and a core fusing agent (second fusing agent). In some examples, the absorption of the second fusing agent generates heat suitable for fusing during 3D printing, which leads to 3D parts having mechanical integrity and relatively uniform mechanical properties (e.g., strength, elongation at break, etc.). This absorption, however, also results in strongly colored, e.g., black, 3D parts. In some other examples, the absorption of a first fusing agent is used instead of the second fusing agent to build the entire 3D part. This example of the first fusing agent includes metal oxide nanoparticles. The first fusing agent are a plasmonic resonance absorber, having absorption at wavelengths ranging from 800 nm to 4000 nm and transparency at wavelengths ranging from 400 nm to 780 nm.

As used herein "absorption" means that at least 80% of radiation having wavelengths ranging from 800 nm to 4000 nm is absorbed. Also used herein, "transparency" means that 20% or less of radiation having wavelengths ranging from 400 nm to 780 nm is absorbed. This absorption and transparency allows the first fusing agent to absorb enough radiation to fuse the build material in contact therewith while causing the 3D part to be white or slightly colored.

Other examples of the compositions, methods, and systems disclosed herein utilize a combination of different fusing agents (e.g., the second fusing agent and the first fusing agent) to build a part having a core (innermost layers or region) with mechanical integrity and having an exterior (outermost layers or region) with color (i.e., white or some color other than black).

3D Printing Method

In some examples, as illustrated in FIG. 1, disclosed is a method for three-dimensional printing 100 comprising: (A) depositing a layer of build material 102, wherein the build material is selected from the group consisting of polymeric powder, polymer-ceramic composite powder, and combinations thereof; and then carrying out at least one of the following: (B) selectively applying: a cyan ink composition, a yellow ink composition, a magenta ink composition, and/or a black ink composition on the build material 104; (C) selectively applying a first fusing agent on the build material 106, wherein the first fusing agent comprises at least one nanoparticle, wherein the nanoparticle comprises at least one metal oxide, which absorbs infrared light in a range of from about 780 nm to about 2300 nm and is shown in formula (1):

$$M_m M'O_n \tag{1}$$

wherein M is an alkali metal, m is greater than 0 and less than 1, M' is any metal, and n is greater than 0 and less than or equal to 4; and wherein the nanoparticle has a diameter of from about 0.1 nm to about 500 nm; (D) selectively applying a second fusing agent on the build material 108, wherein the second fusing agent comprises at least one near infrared absorbing compound; (E) repeating (A) and at least one of (B), (C), and (D) at least once to form a three-dimensional part 110.

Figure 2:
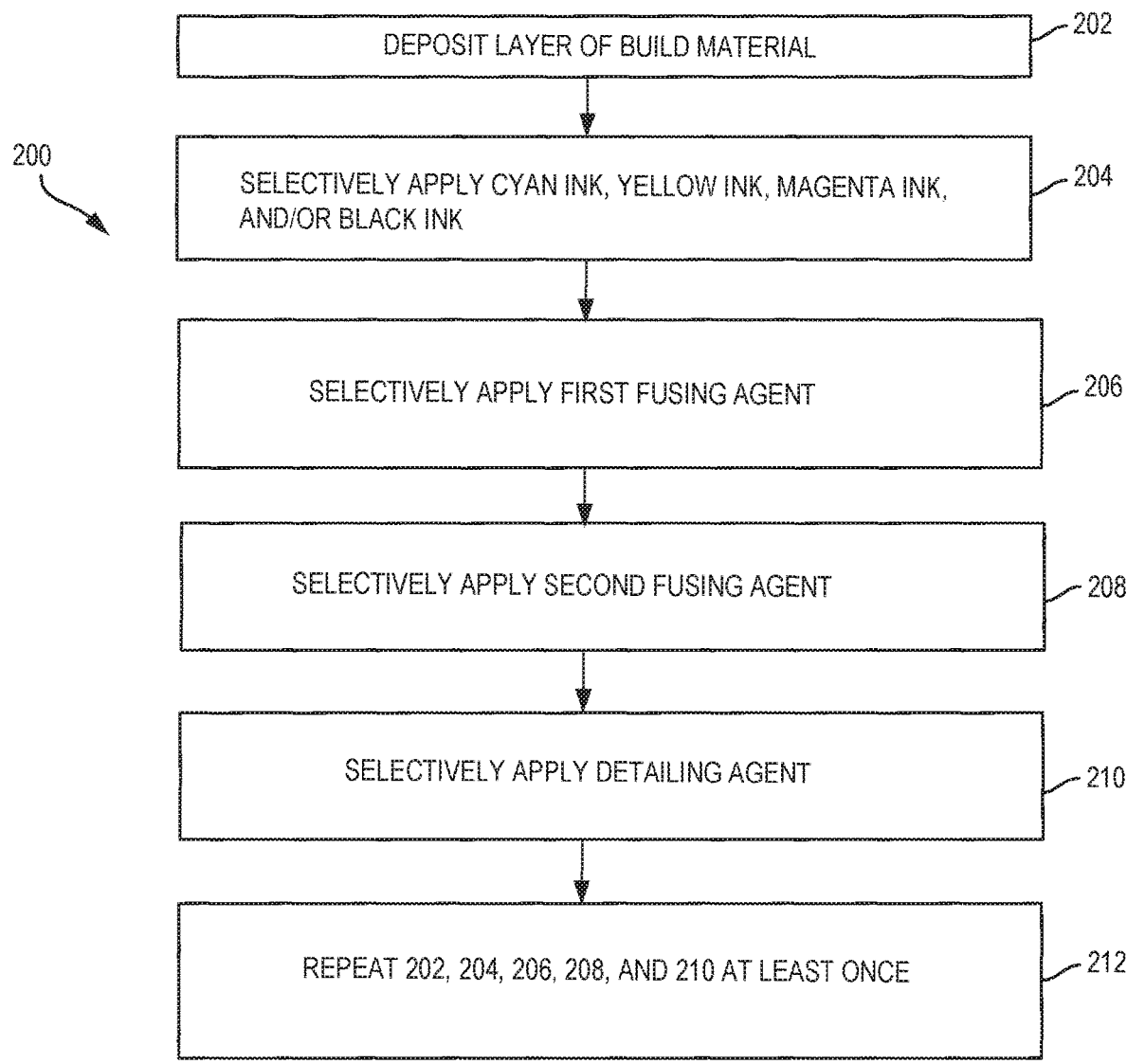

In some other examples, as illustrated in FIG. 2, disclosed is a method of forming a three-dimensional part 200 comprising: (A) depositing a layer of build material 202, wherein the build material is selected from the group consisting of polymeric powder, polymeric-ceramic composite powder, and combinations thereof; (B) selectively applying: a cyan ink composition, a yellow ink composition, a magenta ink composition, and/or a black ink composition on the build material 204; (C) selectively applying a first fusing agent on the build material 206, wherein the first fusing agent comprises at least one nanoparticle, wherein the nanoparticle comprises at least one metal oxide, which absorbs infrared light in a range of from about 780 nm to about 2300 nm and is shown in formula (1):

$$M_m M'O_n \tag{1}$$

wherein M is an alkali metal, m is greater than 0 and less than 1, M' is any metal, and n is greater than 0 and less than or equal to 4; and wherein the nanoparticle has a diameter of from about 0.1 nm to about 500 nm; (D) selectively applying a second fusing agent on the build material 208, wherein the second fusing agent comprises at least one near infrared absorbing compound; (E) selectively applying a detailing agent on the build material 210; and (F) repeating (A), (B), (C), (D), and (E) at least once to form the three-dimensional part 212.

Within such three-dimensional (3D) printing methods, the first fusing agent and the second fusing agent enhance the absorption of the radiation, convert the absorbed radiation to thermal energy, and promote the transfer of the thermal heat to the build material particles in contact therewith.

In an example, the first fusing agent and the second fusing agent sufficiently elevate the temperature of the build material particles above the melting or softening point of the particles, allowing fusing (e.g., sintering, binding, curing, etc.) of the build material particles to take place. Exposure to electromagnetic radiation forms a layer of the 3D part/object. Such a layer could be a colored layer when a colored ink composition is further applied, either simultaneously with the first fusing agent and/or second fusing agent, or subsequently. It is to be understood that portions of the build material that do not have the first fusing agent or the second fusing agent applied thereto do not absorb enough energy to fuse.

3D Printing System

Figure 3:
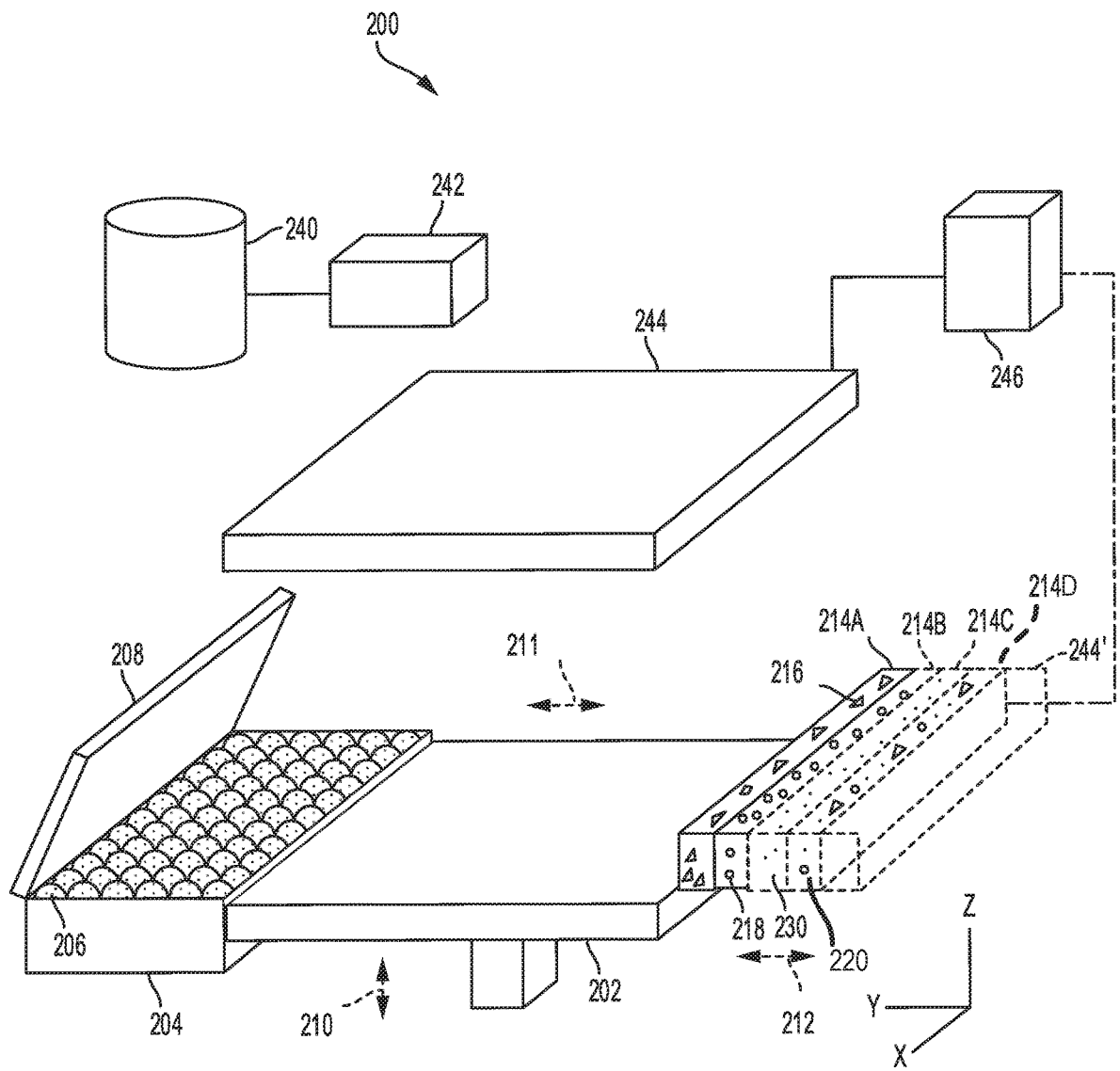
FIG. 3 is a simplified isometric view of an example of a 3D printing system according to the present disclosure.

The three-dimensional printing compositions, described herein, are printed and methods, described herein, carried out using a three-dimensional printing system described herein. An example of a 3D printing system 200 is depicted in FIG. 3. It is to be understood that the 3D printing system 200 may include additional components and that some of the components described herein may be removed and/or modified. Furthermore, components of the 3D printing system 200 depicted in FIG. 3 may not be drawn to scale and thus, the 3D printing system 200 may have a different size and/or configuration other than as shown therein.

The printing system 200 includes a build area platform 202, a build material supply 204 containing build material particles 206, and a build material distributor 208. The build area platform 202 receives the build material particles 206 from the build material supply 204. The build area platform 202 may be integrated with the printing system 200 or may be a component that is separately insertable into the printing system 200. For example, the build area platform 202 may be a module that is available separately from the printing system 200. The build material platform 202 that is shown is also one example, and could be replaced with another support member, such as a platen, a fabrication/print bed, a glass plate, or another build surface.

The build area platform 202 may be moved in a direction as denoted by the arrow 210, e.g., along the z-axis, so that build material particles 206 may be delivered to the platform 202 or to a previously formed part layer. In an example, when the build material particles 206 are to be delivered, the build area platform 202 may be programmed to advance (e.g., downward) enough so that the build material distributor 208 can push the build material particles 206 onto the platform 202 to form a substantially uniform layer of the build material particles 206 thereon. The build area platform 202 may also be returned to its original position, for example, when a new part is to be built. The build material supply 204 may be a container, bed, or other surface that is to position the build material particles 206 between the build material distributor 208 and the build area platform 202. In some examples, the build material supply 204 may include a surface upon which the build material particles 206 may be supplied, for instance, from a build material source (not shown) located above the build material supply 204. Examples of the build material source may include a hopper, an auger conveyer, or the like. Additionally, or alternatively, the build material supply 204 may include a mechanism (e.g., a delivery piston) to provide, e.g., move, the build material particles 206 from a storage location to a position to be spread onto the build area platform 202 or onto a previously formed part layer.

The build material distributor 208 may be moved in a direction as denoted by the arrow 211, e.g., along the y-axis, over the build material supply 204 and across the build area platform 202 to spread a layer of the build material particles 206 over the build area platform 202. The build material distributor 208 may also be returned to a position adjacent to the build material supply 204 following the spreading of the build material particles 206. The build material distributor 208 may be a blade (e.g., a doctor blade), a roller, a combination of a roller and a blade, and/or any other device capable of spreading the build material particles 206 over the build area platform 202. For instance, the build material distributor 18 may be a counter-rotating roller.

As shown in FIG. 3, the printing system 200 also includes an inkjet applicator 214A, which may contain examples of the first fusing agent 216. As depicted in FIG. 3, some examples of the printing system 200 may include at least one additional applicator 2146 and/or 214C and/or 214D. In one example, the printing system 200 includes applicator 2146, which may contain a second fusing agent 218, in addition to the inkjet applicator 214A. In another example, the printing system 200 includes inkjet applicator 214C, which may contain a colored ink composition 230, in addition to the inkjet applicator 214A and/or 2146. In another example, the printing system 200 includes inkjet applicator 214D, which may contain a detailing agent 220, in addition to the inkjet applicator 214A and/or 2146 and 214C.

In some examples, the printing system 200 includes inkjet applicators 214A, 2146, 214C, and 214D.

The inkjet applicator(s) 214A, 2146, 214C, and 214D may be scanned across the build area platform 202 in the direction indicated by the arrow 212, e.g., along the y-axis. The inkjet applicator(s) 214A, 2146, 214C, and 214D may be, for instance, a thermal inkjet printhead, a piezoelectric printhead, etc., and may extend a width of the build area platform 202. While each of the inkjet applicator(s) 214A, 2146, 214C, and 214D is shown in FIG. 3 as a single applicator, it is to be understood that each of the inkjet applicator(s) 214A, 2146, 214C, and 214D may include multiple inkjet applicators that span the width of the build area platform 202. Additionally, the inkjet applicator(s) 214A, 2146, 214C, and 214D may be positioned in multiple printbars. The inkjet applicator(s) 214A, 2146, 214C, and 214D may also be scanned along the x-axis, for instance, in configurations in which the inkjet applicator(s) 214A, 2146, 214C, and 214D does/do not span the width of the build area platform 202 to enable the inkjet applicator(s) 214A, 2146, 214C, and 214D to respectively deposit the first fusing agent 216, the second fusing agent 218, the colored inkjet ink 230, and the detailing agent 220, over a large area of a layer of build material particles 206. The inkjet applicator(s) 214A, 2146, 214C, and 214D may thus be attached to a moving XY stage or a translational carriage (neither of which is shown) that moves the inkjet applicator(s) 214A, 2146, 214C, and 214D adjacent to the build area platform 202 in order to deposit the respective fluids 216, 218, 230, and 220 in predetermined areas of a layer of the build material particles 206 that has been formed on the build area platform 202 in accordance with the method(s) disclosed herein. The inkjet applicator(s) 214A, 214B, 214C, and 214D may include a plurality of nozzles (not shown) through which the compositions 216, 218, 230, and 220 are to be respectively ejected.

The inkjet applicators 214A, 214B, 214C, and 214D may respectively deliver drops of the first fusing agent 216, the second fusing agent 218, the colored ink compositions (cyan ink composition, yellow ink composition, magenta ink composition, and black in composition) 230, and the detailing agent 220 at a resolution ranging from about 300 dots per inch (DPI) to about 1200 DPI. In other examples, the applicator(s) 214A, 214B, 214C, and 214D may deliver drops of the respective fluids 216, 218, 230, and 220 at a higher or lower resolution. The drop velocity may range from about 5 m/s to about 24 m/s and the firing frequency may range from about 1 kHz to about 100 kHz. In one example, each drop may be in the order of about 10 picoliters (pl) per drop, although it is contemplated that a higher or lower drop size may be used. In some examples, inkjet applicators 214A, 214B, 214C, and 214D are able to deliver variable size drops of the fluids 216, 218, 230, and 220, respectively.

Each of the previously described physical elements may be operatively connected to a controller 240 of the printing system 200. The controller 240 may control the operations of the build area platform 202, the build material supply 204, the build material distributor 208, and the inkjet applicator(s) 214A, 214B, 214C, and 214D. As an example, the controller 240 may control actuators (not shown) to control various operations of the 3D printing system 200 components. The controller 240 may be a computing device, a semiconductor-based microprocessor, a central processing unit (CPU), an application specific integrated circuit (ASIC), and/or another hardware device. Although not shown, the controller 240 may be connected to the 3D printing system 200 components via communication lines.

The controller 240 manipulates and transforms data, which may be represented as physical (electronic) quantities within the printer's registers and memories, in order to control the physical elements to create the 3D part. As such, the controller 240 is depicted as being in communication with a data store 242. The data store 242 may include data pertaining to a 3D part to be printed by the 3D printing system 200. The data for the selective delivery of the build material particles 206, the first fusing agent 216, the second fusing agent 218, the colored ink 230, and the detailing agent 220 may be derived from a model of the 3D part to be formed. For instance, the data may include the locations on each layer of build material particles 206 that the inkjet applicator(s) 214A, 214B, 214C, and 214D are to deposit the first fusing agent 216, the second fusing agent 218, the colored inkjet ink 230, and the detailing agent 220.

After the first fusing agent 216 and/or the second fusing agent 218 are selectively applied in the specific portion(s) of the build material 206, the entire layer of the build material is exposed to electromagnetic radiation. The electromagnetic radiation is emitted from the radiation source 244, 244'. The length of time the electromagnetic radiation is applied for, or energy exposure time, may be dependent, for example, on one or more of: characteristics of the radiation source 244, 244'; characteristics of the build material particles 206; and/or characteristics of the first fusing agent 216 and/or second fusing agent 218.

As shown in FIG. 3, the printing system 200 may also include a radiation source 244, 244'. In some examples, the radiation source 244, 244' may be in a fixed position with respect to the build material platform 202. In other examples, the radiation source 244, 244' may be positioned to expose the layer of build material particles 206 to radiation immediately after the first fusing agent 216 and/or the second fusing agent 218 has been applied thereto.

In the example shown in FIG. 3, the radiation source 244, 244' is attached to the side of the inkjet applicator(s) 214A, 214B, 214C, and 214D which allows for patterning and heating in a single pass. The radiation source 244, 244' may emit electromagnetic radiation having wavelengths ranging from about 400 nm to about 1 mm. As one example, the electromagnetic radiation may range from about 400 nm to about 2 μm. In some examples, any electromagnetic radiation source emitting in the foregoing wavelength range can be used. As another example, the electromagnetic radiation may be blackbody radiation with a maximum intensity at a wavelength of about 1100 nm. The radiation source 244, 244' may be infrared (IR) or near-infrared light sources, such as IR or near-IR curing lamps, IR or near-IR light emitting diodes (LED), or lasers with the desirable IR or near-IR electromagnetic wavelengths. The radiation source 244, 244' may be operatively connected to a lamp/laser driver, an input/output temperature controller, and temperature sensors, which are collectively shown as radiation system components 246.

The radiation system components 246 may operate together to control the radiation source 244, 244'. The temperature recipe (e.g., radiation exposure rate) may be submitted to the input/output temperature controller. During heating, the temperature sensors may sense the temperature of the build material particles 206, and the temperature measurements may be transmitted to the input/output temperature controller. For example, a thermometer associated with the heated area can provide temperature feedback. The input/output temperature controller may adjust the radiation source 244, 244' power set points based on any difference between the recipe and the real-time measurements. These power set points are sent to the lamp/laser drivers, which transmit appropriate lamp/laser voltages to the radiation source 244, 244'. This is one example of the radiation system components 246, and it is to be understood that other radiation source control systems may be used. For example, the controller 240 may be configured to control the radiation source 244, 244'.

In some examples, referring to FIG. 1 and FIG. 3, a method for three-dimensional printing 100 can comprise: (A) depositing a layer of build material 102, wherein the build material is selected from the group consisting of polymeric powder, polymeric-ceramic composite powder, and combinations thereof; and then carrying out at least one of the following: (B) selectively applying a colored ink 230 (which can include a cyan ink composition, a yellow ink composition, a magenta ink composition, and/or a black ink composition) on the build material 104; (C) selectively applying a first fusing agent 216 on the build material 106, wherein the first fusing agent 216 comprises at least one nanoparticle, wherein the nanoparticle comprises at least one metal oxide, which absorbs infrared light in a range of from about 780 nm to about 2300 nm and is shown in formula (1):

$$M_mM'O_n \qquad (1)$$

wherein M is an alkali metal, m is greater than 0 and less than 1, M' is any metal, and n is greater than 0 and less than or equal to 4; and wherein the nanoparticle has a diameter of from about 0.1 nm to about 500 nm; (D) selectively applying a second fusing agent 218 on the build material 108, wherein the second fusing agent 218 comprises at least one near infrared absorbing compound; (E) repeating (A) and at least one of (B), (C), and (D) at least once to form a three-dimensional part 110.

In some examples, referring to FIGS. 2 and 3, a method of forming a three-dimensional part 200 can comprise: (A) depositing a layer of build material 202, wherein the build material is selected from the group consisting of polymeric powder, polymeric-ceramic composite powder, and combinations thereof; (B) selectively applying a colored ink 230 (which can include a cyan ink composition, a yellow ink composition, a magenta ink composition, and/or a black ink composition) on the build material 204; (C) selectively applying a first fusing agent 216 on the build material 206, wherein the first fusing agent 216 comprises at least one nanoparticle, wherein the nanoparticle comprises at least one metal oxide, which absorbs infrared light in a range of from about 780 nm to about 2300 nm and is shown in formula (1):

$$M_mM'O_n \qquad (1)$$

wherein M is an alkali metal, m is greater than 0 and less than 1, M' is any metal, and n is greater than 0 and less than or equal to 4; and wherein the nanoparticle has a diameter of from about 0.1 nm to about 500 nm; (D) selectively applying a second fusing 218 agent on the build material 208, wherein the second fusing 218 agent comprises at least one near infrared absorbing compound; (E) selectively applying a detailing agent 220 on the build material 210; and (F) repeating (A), (B), (C), (D), and (E) at least once to form the three-dimensional part 212.

A layer of the build material particles 206 is applied on the build area platform 202. As previously described, the build material supply 204 may supply the build material particles into a position so that they are ready to be spread onto the build area platform 202, and the build material distributor 208 may spread the supplied build material particles 206 onto the build area platform 202. The controller 240 may execute control build material supply instructions to control the build material supply to appropriately position the build material particles 206, and may execute control spreader instructions to control the build material distributor 208 to spread the supplied build material particles over the build area platform to form a layer of build material particles 206. After the layer is applied, the first fusing agent 216, the second fusing agent 218, the color ink 230, and the detailing agent 220 are selectively applied on portion(s) of the build material particles 206 which is then exposed to electromagnetic radiation. In some examples, electromagnetic radiation can be applied on a layer-by-layer basis.

In some examples, the first fusing agent 216 and the second fusing agent 218 can enhance the absorption of the radiation in portion(s), converting the absorbed radiation to thermal energy, and promoting the transfer of the thermal heat to the build material particles 206 in contact therewith. In an example, the first fusing agent 216 and/or the second fusing agent 218 can sufficiently elevate the temperature of the build material particles in applied portions above the melting or softening point of the build material particles 206, allowing fusing (e.g., sintering, binding, curing, etc.) of the build material particles to take place. Exposure to electromagnetic radiation forms parts of one or more layers of the final 3D object or article. It is to be understood that portions of the build material that do not have any fusing agent applied thereto do not absorb enough energy to fuse. Additional layer(s) may be formed to create an example of the 3D part.

In some examples, to form additional layers, additional polymeric build material may be applied on the formed/fused layer or the layer of build material with selectively applied first and second fusing agents. The first and second fusing agents can then be selectively applied on at least a portion of the additional build material particles, according to a pattern of a cross-section for the layer which is being formed. The application of additional polymeric build material particles, the selective application of the first fusing agent and/or second fusing agent, and the electromagnetic radiation exposure may be repeated a predetermined number of cycles to form the layers that will create the final 3D object or article. In some examples, after a first layer is formed, the first fusing agent 216, the second fusing agent 218, the colored ink 230, and the detailing agent 220 are selectively applied on some portions of the build material particles 206. After repetition of these building and application steps, a three-dimensional printed part or object is formed.

First Fusing Agent

In some examples, described herein is a first fusing agent comprising at least one nanoparticle comprising: at least one metal oxide, which absorbs infrared light in a range of from about 780 nm to about 2300 nm and is shown in formula (1):

$$M_mM'O_n \tag{1}$$

wherein M is an alkali metal, m is greater than 0 and less than 1, M' is any metal, and n is greater than 0 and less than or equal to 4; and wherein the nanoparticle has a diameter of from about 0.1 nm to about 500 nm.

The metal oxide can be an IR absorbing inorganic nanoparticle. In some examples, the metal oxide can absorb infrared light in a range of from about 780 nm to about 2300 nm, or from about 790 nm to about 1800 nm, or from about 800 nm to about 1500 nm, or from about 810 nm to about 1200 nm, or from about 820 nm to about 1100 nm, or from about 830 nm to about 1000 nm.

In some examples, the metal oxide can be defined as shown in formula (1) below:

$$M_mM'O_n \tag{1}$$

M in formula (1) above can be an alkali metal. In some examples, M can be lithium (Li), sodium (Na), potassium (K), rubidium (Rb), cesium (Cs), or mixtures thereof. In some examples, M can be cesium (Cs).

m in formula (1) above can be greater than 0 and less than 1. In some examples, m can be 0.33.

M' in formula (1) above can be any metal. In some examples, M' can be tungsten (W), molybdenum (Mb), tantalum (Ta), hafnium (Hf), cerium (Ce), lanthanum (La), or mixtures thereof. In some examples, M' can be tungsten (W).

n in formula (1) above can be greater than 0 and less than or equal to 4. In some examples, n in formula (1) above can be greater than 0 and less than or equal to 3.

In some examples, the nanoparticle can have a diameter of from about 0.1 nm to about 500 nm, or from about 0.5 nm to about 400 nm, or from about 0.6 nm to about 300 nm, or from about 0.7 nm to about 250 nm, or from about 0.8 nm to about 200 nm, or from about 0.9 nm to about 150 nm, or from about 1 nm to about 100 nm, or from about 1 nm to about 90 nm, or from about 1 nm to about 80 nm, or from about 1 nm to about 70 nm, or from about 1 nm to about 60 nm, or from about 2 nm to about 50 nm, or from about 3 nm to about 40 nm, or from about 4 nm to about 40 nm.

In some examples, the metal oxide particles can have a diameter of from about 0.01 nm to about 400 nm, or from about 0.1 nm to about 350 nm, or from about 0.5 nm to about 300 nm, or from about 0.7 nm to about 250 nm, or from about 0.8 nm to about 200 nm, or from about 0.9 nm to about 150 nm, or from about 1 nm to about 100 nm, or from about 1 nm to about 90 nm, or from about 1 nm to about 80 nm, or from about 1 nm to about 70 nm, or from about 1 nm to about 60 nm, or from about 2 nm to about 50 nm, or from about 3 nm to about 40 nm, or from about 3 nm to about 30 nm, or from about 3 to about 20 nm, or from about 3 to about 10 nm.

In some examples, a first fusing agent used in three-dimensional printing can comprise: (A) water; (B) at least one co-solvent; and (C) at least one nanoparticle comprising: at least one metal oxide, which absorbs infrared light in a range of from about 780 nm to about 2300 nm and is shown in formula (1):

$$M_mM'O_n \tag{1}$$

wherein M is an alkali metal, m is greater than 0 and less than 1, M' is any metal, and n is greater than 0 and less than or equal to 4; and the nanoparticle has a diameter of from about 0.1 nm to about 500 nm.

In some examples, the first fusing agent can further include other additives including at least one buffer solution, at least one surfactant, at least one dispersant, at least one biocide, at least one stabilizer, at least one anti-kogation agent, at least one complexing agent, and/or combinations thereof.

In some examples, the at least one nanoparticle is present in an amount of from about 1 wt % to about 20 wt % based on the total weight of the first fusing agent.

In some examples, the first fusing agent is added in the three-dimensional printing composition in an amount of from about 1 wt % to about 30 wt % based on the total weight of the three-dimensional printing composition, or from about 5 wt % to about 25 wt %, or from about 8 wt % to about 20 wt %, or less than about 35 wt %, or less than about 25 wt %, or less than about 20 wt %, or less than about 15 wt %, or less than about 10 wt %, or at least about 1 wt %, or at least about 3 wt %, or at least about 5 wt %, or at least about 8 wt %, or at least about 10 wt %, or at least about 15 wt %, or at least about 20 wt %, or at least about 30 wt %, or at least about 35 wt %.

In some examples, the nanoparticles in the first fusing agent are present in an amount of at least about 1 wt % based on the total weight of first fusing agent, or at least about 3 wt %, or at least about 5 wt %, or at least about 7 wt %, or at least about 10 wt %, or at least 15 wt %, or less than about 20 wt %, or less than about 15 wt %, or less than about 12 wt %, or less than about 10 wt %, or less than about 8 wt %, or less than about 7 wt %, or less than about 6 wt %, or less than about 5 wt %.

In some examples, in formula (1) shown above, M is cesium (Cs), m is 0.33, M' is tungsten (W), and n is greater than 0 and less than or equal to 3.

In some examples, the metal oxide nanoparticles are plasmonic resonance absorbers, having absorption at wavelengths ranging from 800 nm to 4000 nm and transparency at wavelengths ranging from 400 nm to 780 nm. As used herein "absorption" means that at least 80% of radiation having wavelengths ranging from 800 nm to 4000 nm is absorbed. Also used herein, "transparency" means that 40% or less of radiation having wavelengths ranging from 400 nm to 780 nm is absorbed. This absorption and transparency allows the first fusing agent to absorb enough radiation to fuse the build material in contact therewith while causing the 3D part to be white or slightly colored. The metal oxide nanoparticles can be considered as the first fusing agent per se, i.e., the specific compound that provides the specific properties to the first fusing agent composition 216.

In some examples, the metal oxide nanoparticles that are part of the first fusing agent composition, have the formula (1) $M_mM'O_n$ wherein M is an alkali metal, m is greater than 0 and less than 1, M' is any metal, and n is greater than 0 and less than or equal to 4. The metal oxide nanoparticles are a dispersion in the first fusing agent composition. As used herein, the term "dispersion" can refer to a two-phase system where one phase consists of finely divided metal oxide particle distributed throughout a bulk substance, i.e., liquid vehicle. The metal oxide nanoparticles are the dispersed or internal phase and the bulk substance is the continuous or external phase (liquid vehicle). As disclosed herein, the liquid medium is an aqueous liquid medium, i.e., comprising water and in some examples water and at least one co-solvent.

In some examples, the metal oxide nanoparticles have formula (1): $M_mM'O_n$ (1) wherein M is an alkali metal, m is greater than 0 and less than 1, M' is any metal, and n is greater than 0 and less than or equal to 4. As per formula (1), M is an alkali metal, and can be lithium (Li), sodium (Na), potassium (K), rubidium (Rb), cesium (Cs), or mixtures thereof. Indeed, without being linked by any theory, it is believed that such compound possesses a satisfactory absorption of NIR light (having a wavelength between about 750 nm to about 1400 nm) while retaining a high transmittance of visible light (having a wavelength between about 380 nm to about 750 nm).

In some examples, the nanoparticles absorb infrared light in a range of from about 750 nm to about 2300 nm. In some other examples, the nanoparticles absorb infrared light in a range of from about 780 nm to about 1400 nm. In yet some other examples, the nanoparticles absorb infrared light in a range of from about 780 nm to about 2300 nm. The metal oxide nanoparticles can also absorb infrared light in a range of from about 780 nm to about 2300 nm, or from about 790 nm to about 1800 nm, or from about 800 nm to about 1500 nm, or from about 810 nm to about 1200 nm, or from about 820 nm to about 1100 nm, or from about 830 nm to about 1000 nm. The metal oxide can be an IR absorbing inorganic nanoparticle.

The metal oxide nanoparticles present in the first fusing agent, have the formula (1) $M_mM'O_n$. In the formula (1), M is an alkali metal. In some examples, M is lithium (Li), sodium (Na), potassium (K), rubidium (Rb), cesium (Cs), or mixtures thereof. In some other examples, M is cesium (Cs). In the formula (1), M' is any metal. In some examples, M' is tungsten (W), molybdenum (Mb), tantalum (Ta), hafnium (Hf), cerium (Ce), lanthanum (La), or mixtures thereof. In some other examples, M' is tungsten (W). In the formula (1), m is greater than 0 and less than 1. In some examples, m can be 0.33. In the formula (1), n is greater than 0 and less than or equal to 4. In some examples, n can be greater than 0 and less than or equal to 3. In some examples, the nanoparticles of the present disclosure have the formula (1) $MmM'On$, wherein M is tungsten (W), n is 3 and M is lithium (Li), sodium (Na), potassium (K), rubidium (Rb), cesium (Cs), or mixtures thereof. The nanoparticles are thus tungsten bronze nanoparticles having the formula $MmWO_3$.

In some other examples, the metal oxide nanoparticles are cesium tungsten nanoparticles having the formula (1) $MmM'On$, wherein M is cesium (Cs), m is 0.33, M' is tungsten (W), and n is greater than 0 and less than or equal to 3. In an example, the metal oxide nanoparticle is a cesium tungsten oxide nanoparticles having a general formula of $Cs_xWO_3$, where 0<x<1. The cesium tungsten oxide nanoparticles may give the dispersion a light blue color. The strength of the color may depend, at least in part, on the amount of the cesium tungsten oxide nanoparticles in the dispersion.

In some examples, the metal oxide particles can have a diameter of from about 0.01 nm to about 400 nm, or from about 0.1 nm to about 350 nm, or from about 0.5 nm to about 300 nm, or from about 0.7 nm to about 250 nm, or from about 0.8 nm to about 200 nm, or from about 0.9 nm to about 150 nm, or from about 1 nm to about 100 nm, or from about 1 nm to about 90 nm, or from about 1 nm to about 80 nm, or from about 1 nm to about 70 nm, or from about 1 nm to about 60 nm, or from about 2 nm to about 50 nm, or from about 3 nm to about 40 nm, or from about 3 nm to about 30 nm, or from about 3 to about 20 nm, or from about 3 to about 10 nm. In a more specific example, the average particle size (e.g., volume-weighted mean diameter) of the metal oxide nanoparticles may range from about 1 nm to about 40 nm. In some examples, the average particle size of the metal oxide nanoparticles may range from about 1 nm to about 15 nm or from about 1 nm to about 10 nm. The upper end of the particle size range (e.g., from about 30 nm to about 40 nm) may be less desirable, as these particles may be more difficult to stabilize. In some examples, the metal oxide nanoparticles may be present in first fusing agent composition in an amount ranging from about 1 wt % to about 20 wt % (based on the total wt % of the first fusing agent composition).

The first fusing agent composition comprising metal oxide nanoparticles, also includes the zwitterionic stabilizer. The zwitterionic stabilizer may improve the stabilization of the dispersion. While the zwitterionic stabilizer has an overall neutral charge, at least one area of the molecule has a positive charge (e.g., amino groups) and at least one other area of the molecule has a negative charge. The metal oxide nanoparticles may have a slight negative charge. The zwitterionic stabilizer molecules may orient around the slightly negative metal oxide nanoparticles with the positive area of the zwitterionic stabilizer molecules closest to the metal oxide nanoparticles and the negative area of the zwitterionic stabilizer molecules furthest away from the metal oxide nanoparticles. Then the negative charge of the negative area of the zwitterionic stabilizer molecules may repel metal oxide nanoparticles from each other. The zwitterionic stabilizer molecules may form a protective layer around the metal oxide nanoparticles, and prevent them from coming into direct contact with each other and/or increase the distance between the particle surfaces (e.g., by a distance ranging from about 1 nm to about 2 nm). Thus, the zwitterionic stabilizer may prevent the metal oxide nanoparticles from agglomerating and/or settling in the dispersion. Examples of suitable zwitterionic stabilizers include $C_2$ to $C_8$ betaines, $C_2$ to $C_8$ amino-carboxylic acids having a solubility of at least 10 g in 100 g of water, taurine, and combinations thereof. Examples of the $C_2$ to $C_8$ amino-carboxylic acids include beta-alanine, gamma-aminobutyric acid, glycine, and combinations thereof.

The zwitterionic stabilizer may be present, in the first fusing agent composition, in an amount ranging from about 2 wt % to about 35 wt % (based on the total wt % of the first fusing agent composition). When the zwitterionic stabilizer is the $C_2$ to $C_8$ betaine, the $C_2$ to $C_8$ betaine may be present in an amount ranging from about 4 wt % to about 35 wt % of a total wt % of the first fusing agent composition. When the zwitterionic stabilizer is the $C_2$ to $C_8$ amino-carboxylic acid, the $C_2$ to $C_8$ amino-carboxylic acid may be present in an amount ranging from about 2 wt % to about 20 wt % of a total wt % of the first fusing agent composition. When the zwitterionic stabilizer is taurine, taurine may be present in an amount ranging from about 2 wt % to about 35 wt % of a total wt % of the first fusing agent composition. The zwitterionic stabilizer may be added to the metal oxide nanoparticles and water before, during, or after milling of the nanoparticles in the water to form the dispersion that would be part of the first fusing agent composition.

In an example, the first fusing agent composition disclosed herein includes the metal oxide nanoparticles, the zwitterionic stabilizer, a surfactant, and a liquid vehicle. In another example, the first fusing agent composition includes the metal oxide nanoparticles, the zwitterionic stabilizer, a co-solvent, a surfactant, and a balance of water. In yet other examples, the first fusing agent composition may include additional components, such as an additive. As used herein, the terms "liquid vehicle" and "vehicle" may refer to the liquid fluid in which the metal oxide nanoparticles and the zwitterionic stabilizer are placed to form the first fusing agent composition. A wide variety of liquid vehicles may be used with the first fusing agent composition set of the present disclosure. The vehicle may include water alone or in combination with a variety of additional components. Examples of these additional components may include co-solvent, surfactant, antimicrobial agent, anti-kogation agent, and/or a chelating agent.

The liquid vehicle of the first fusing agent composition may also include surfactants. The surfactant may be present in an amount ranging from about 0.1 wt % to about 4 wt % (based on the total wt % of the first fusing agent composition). Examples of suitable surfactants are non-ionic surfactants. Some specific examples include a self-emulsifiable, nonionic wetting agent based on acetylenic diol chemistry (e.g., Surfynol® SEF from Air Products and Chemicals, Inc.), a nonionic fluorosurfactant (e.g., Capstone® fluorosurfactants from DuPont, previously known as Zonyl FSO), and combinations thereof. In other examples, the surfactant is an ethoxylated low-foam wetting agent (e.g., Surfynol® 440 or Surfynol® CT-111 from Air Products and Chemical Inc.) or an ethoxylated wetting agent and molecular defoamer (e.g., Surfynol® 420 from Air Products and Chemical Inc.). Still other suitable surfactants include nonionic wetting agents and molecular defoamers (e.g., Surfynol® 104E from Air Products and Chemical Inc.), or water-soluble, non-ionic surfactants (e.g., Tergitol® TMN-6, Tergitol® 15S7, and Tergitol® 15S9 from The Dow Chemical Company). In some examples, an anionic surfactant may be used in combination with the non-ionic surfactant. One suitable anionic surfactant is an alkyldiphenyloxide disulfonate (e.g., Dowfax® 8390 and Dowfax® 2A1 from The Dow Chemical Company). In some examples, it may be desirable to utilize a surfactant having a hydrophilic-lipophilic balance (HLB) less than 10.

The vehicle may include co-solvent(s). Some examples of the co-solvent that may be added to the vehicle include 1-(2-hydroxyethyl)-2-pyrollidinone, 2-pyrrolidinone, 2-methyl-1,3-propanediol, 1,5-pentanediol, triethylene glycol, tetraethylene glycol, 1,6-hexanediol, tripropylene glycol methyl ether, ethoxylated glycerol-1 (LEG-1), and combinations thereof. Whether a single co-solvent is used or a combination of co-solvents is used, the total amount of co-solvent(s) in the first fusing agent composition may range from about 2 wt % to about 80 wt % with respect to the total wt % of the first fusing agent composition.

In some examples, the liquid vehicle may also include one or more additives. The additive may be an anti-kogation agent, a chelating agent, an antimicrobial agent, or a combination thereof. While the amount of the additive may vary depending upon the type of additive, generally the additive may be present in the first fusing agent composition in an amount ranging from about 0.001 wt % to about 20 wt % (based on the total wt % of the first fusing agent composition).

An anti-kogation agent may be included in the first fusing agent composition. Kogation refers to the deposit of dried first fusing agent composition components on a heating element of a thermal inkjet printhead. Anti-kogation agent(s) is/are included to assist in preventing the buildup of kogation. Examples of suitable anti-kogation agents include oleth-3-phosphate (e.g., commercially available as Crodafos®O3A or Crodafos®N-3 acid from Croda), or a combination of oleth-3-phosphate and a low molecular weight (e.g., <5,000) polyacrylic acid polymer. Whether a single anti-kogation agent is used or a combination of anti-kogation agents is used, the total amount of anti-kogation agent(s) in the first fusing agent composition may range from about 0.1 wt % to about 0.2 wt % (based on the total wt % of the first fusing agent composition).

The liquid vehicle may also include a chelating agent. The chelating agent may be included in the first fusing agent composition to eliminate the deleterious effects of heavy metal impurities. Examples of suitable chelating agents include disodium ethylene-diaminetetraacetic acid (EDTA-Na), ethylene diamine tetra acetic acid (EDTA), and methylglycinediacetic acid (e.g., Trilon® M from BASF Corp.). Whether a single chelating agent is used or a combination of chelating agents is used, the total amount of chelating agent(s) in the first fusing agent composition may range from 0 wt % to about 2 wt % based on the total wt % of the first fusing agent composition.

The liquid vehicle may also include antimicrobial agents. Suitable antimicrobial agents include biocides and fungicides. Example antimicrobial agents may include the Nuosept® (Ashland Inc.), Vancide® (R.T. Vanderbilt Co.), Acticide® B20 and Acticide® M20 (Thor Chemicals), and combinations thereof. In an example, the first fusing agent composition may include a total amount of antimicrobial agents that ranges from about 0.1 wt % to about 1 wt % (based on the total wt % of the first fusing agent composition). In some examples disclosed herein, the vehicle of the first fusing agent composition may also include additional dispersants (e.g., a low molecular weight (e.g., <5,000) polyacrylic acid polymer, such as Carbosperse®K-7028 Polyacrylate from Lubrizol), preservatives, jettability additives, and the like.

The first fusing agent (or first fusing agent (LTFA)) 216 can be an aqueous jettable composition that can include metal oxide nanoparticles; a zwitterionic stabilizer; a surfactant; and an aqueous vehicle. The first fusing agent composition comprises metal oxide nanoparticle that might give the fusing agent a transparent or translucent or a light blue color. The first fusing agent is different from the second fusing agent due to its chemical composition and also due to its final color. The first fusing agent composition 216 comprises metal oxide nanoparticles that act as a plasmonic resonance absorber. The metal oxide nanoparticles (plasmonic resonance absorber) allows the first fusing agent composition to absorb radiation at wavelengths ranging from 800 nm to 4000 nm, which enables the First fusing agent composition to convert enough radiation to thermal energy so that the build material particles fuse. The plasmonic resonance absorber also allows the first fusing agent composition to have transparency at wavelengths ranging from 400 nm to 780 nm, which enables the 3D part or layer form with agent to be white or slightly colored. The term "low tint" is used herein to define the fusing agent by opposition to the "core" fusing agent. The "low tint" will provide to the parts containing it, a "low tint" color in relation with its absorption range (nearly transparency at wavelengths ranging from 400 nm to 780 nm). On the opposite, the second fusing agent since its contains a radiation absorbing agent, will provide to the parts containing it, a dark color in relation with the absorption of the colorant contained in it. The colorant can be any infrared light absorbing colorant (and can be black reflecting thus a black color).

Second Fusing Agent

In some examples, the second fusing agent comprises a near infrared absorbing compound.

In some examples, the near infrared absorbing compound is selected from the group consisting of carbon black, oxonol, squarylium, chalcogenopyrylarylidene, bis(chalcogenopyrylo)polymethine, bis(aminoaryl)polymethine, merocyanine, trinuclear cyanine, indene-crosslinked polymethine, oxyindolidine, iron complexes, quinoids, nickel-dithiolene complex, cyanine dyes, and combinations thereof.

The cyanine dyes can be selected from the group consisting of carbocyanine, azacarbocyanine, hemicyanine, styryl, diazacarbocyanine, triazacarbocyanine, diazahemicyanine, polymethinecyanine, azapolymethinecyanine, holopolar, indocyanine, diazahemicyanine dyes, and combinations thereof.

In some examples, the near infrared absorbing compound is carbon black.

In some examples, the second fusing agent further comprises: at least one co-solvent; at least one surfactant; at least one anti-kogation agent; at least one chelating agent; at least one buffer solution; at least one biocide; and water.

In some examples, the second fusing agent is added in the three-dimensional printing composition in an amount of from about 1 wt % to about 30 wt % based on the total weight of the three-dimensional printing composition, or from about 5 wt % to about 25 wt %, or from about 8 wt % to about 20 wt %, or less than about 35 wt %, or less than about 25 wt %, or less than about 20 wt %, or less than about 15 wt %, or less than about 10 wt %, or at least about 1 wt %, or at least about 3 wt %, or at least about 5 wt %, or at least about 8 wt %, or at least about 10 wt %, or at least about 15 wt %, or at least about 20 wt %, or at least about 30 wt %, or at least about 35 wt %.

In some examples, the near infrared absorbing compound in the second fusing agent is present in an amount of at least about 1 wt % based on the total weight of second fusing agent, or at least about 3 wt %, or at least about 5 wt %, or at least about 7 wt %, or at least about 10 wt %, or at least 15 wt %, or less than about 20 wt %, or less than about 15 wt %, or less than about 12 wt %, or less than about 10 wt %, or less than about 8 wt %, or less than about 7 wt %, or less than about 6 wt %, or less than about 5 wt %.

The second fusing agent 218 is a jettable composition. The second fusing agent composition is an aqueous jettable composition that includes radiation absorbing agent (i.e., an active material) and an aqueous vehicle. Examples of the second fusing agent 218 are water-based dispersions including a radiation absorbing agent (i.e., an active material). The amount of the active material in the second fusing agent may depend upon how absorbing the active material is. In an example, the second fusing agent may include the active material and may be applied in an amount sufficient to include at least 0.01 wt % of the active material in the 3D part layer that is formed with the second fusing agent. Even this low amount can produce a black colored part layer. The second fusing agents tend to have significant absorption (e.g., 80%) in the visible region (400 nm-780 nm). This absorption generates heat suitable for fusing during 3D printing, which leads to 3D parts having mechanical integrity and relatively uniform mechanical properties (e.g., strength, elongation at break, etc.). The radiation absorbing agent is a dispersion of material in the aqueous vehicle. As used herein, the term "dispersion" refers to a two-phases system where one phase consists of finely divided radiation absorbing agent distributed throughout a bulk substance, i.e. liquid vehicle. The radiation absorbing agent is the dispersed or internal phase and the bulk substance is the continuous or external phase (liquid vehicle). As disclosed herein the liquid medium is an aqueous liquid medium, i.e. comprising water.

The active material, or radiation absorbing agent, may be any infrared light absorbing colorant that is black. In an example, the active material, or radiation absorbing agent is a near infrared absorbing compound. Any near infrared black colorants may be used. In some examples, the second fusing agent includes near infrared absorbing compound and an aqueous vehicle.

In some examples, the active material, or radiation absorbing agent, is a carbon back pigment or near infrared absorbing dyes. In some other examples, the active material, or radiation absorbing agent, is a carbon back pigment; and the second fusing agent composition may be an ink formulation including carbon black as the active material. Examples of this ink formulation are commercially known as CM997A, 5206458, C18928, C93848, C93808, or the like, all of which are available from HP Inc. In yet some other examples, the second fusing agent may be an ink formulation including near infrared absorbing dyes as the active material.

The second fusing agent composition is an aqueous formulation (i.e., includes a balance of water) that may also include any of the previously listed co-solvents, non-ionic surfactants, biocides, and/or anti-kogation agents. The second fusing agent composition includes an aqueous vehicle as defined above. In an example of the second fusing agent composition, the co-solvents are present in an amount ranging from about 1 wt % to about 60 wt % of the total wt % of the second fusing agent composition, the non-ionic surfactants are present in an amount ranging from about 0.5 wt. % to about 1.5 wt. % based on the total wt. % of the second fusing agent composition, the biocides are present in an amount ranging from about 0.1 wt. % to about 5 wt. % based on the total wt. % of the second fusing agent composition, and/or the anti-kogation agents are present in an amount ranging from about 0.1 wt. % to about 5 wt. % based on the total wt. % of the second fusing agent composition. Some examples of the second fusing agent composition may also include a pH adjuster, which is used to control the pH of the agent. From 0 wt % to about 2 wt % (of the total wt % of the second fusing agent) of the pH adjuster, for example, can be used.

Color Ink

The colored ink composition 230 can include a colorant, a dispersant/dispersing additive, a co-solvent, and water. The colored ink composition 230 is a water-based inkjet composition. In some instances, the colored ink composition includes these components and no other components. In other instances, the colored ink composition may further include an anti-kogation agent, a biocide, a binder, and combinations thereof.

The colorant of the colored ink composition is a pigment and/or dye having a color other than white. Examples of the other colors include cyan, magenta, yellow, black, etc. In some instances, the colorant of the colored ink may also be transparent to infrared wavelengths. Examples of IR transparent colorants include acid yellow 23 (AY 23), AY17, acid red 52 (AR 52), AR 289, and reactive red 180 (RR 180). In other instances, the colorant of the colored ink composition may not be completely transparent to infrared wavelengths, but does not absorb enough radiation to sufficiently heat the build material particles in contact therewith. For example, the colorant of the colored ink composition may absorb some visible wavelengths and some IR wavelengths. Some examples of these colorants include cyan colorants, such as direct blue 199 (DB 199) and pigment blue 15:3 (PB 15:3).

The colored ink composition also includes the dispersing additive, which helps to uniformly distribute the colorant throughout the colored ink composition and aid in the wetting of the ink 230 onto the build material particles. Any of the dispersing additives discussed herein for the fusing agent may be used in the colored ink composition. The dispersing additive may be present in the colored ink composition in a similar amount as the colorant.

In addition to the non-white colorant and the dispersing additives, the colored ink composition may include similar components as the fusing agent (e.g., co-solvent(s), anti-kogation agent(s), biocide(s), water, etc.). The colored ink composition may also include a binder, such as an acrylic latex binder, which may be a copolymer of any two or more of styrene, acrylic acid, methacrylic acid, methyl methacrylate, ethyl methacrylate, and butyl methacrylate. Some examples of the colored ink composition may also include other additives, such as a humectant and lubricant (e.g., Liponic® EG-1 (LEG-1) from Lipo Chemicals), a chelating agent (e.g., disodium ethylene diamine-tetraacetic acid (EDTA-Na)), and/or a buffer.

An example of the pigment based colored ink composition may include from about 1 wt % to about 10 wt % of pigment(s), from about 10 wt % to about 30 wt % of co-solvent(s), from about 1 wt % to about 10 wt % of dispersing additive(s), from 0.01 wt % to about 1 wt % of anti-kogation agent(s), from about 0.1 wt % to about 5 wt % of binder(s), from about 0.05 wt % to about 0.1 wt % biocide(s), and a balance of water. An example of the dye based colored ink composition may include from about 1 wt % to about 7 wt % of dye(s), from about 10 wt % to about 30 wt % of co-solvent(s), from about 1 wt % to about 7 wt % of dispersing additive(s), from 0.05 wt % to about 0.1 wt % of chelating agent(s), from about 0.005 wt % to about 0.2 wt % of buffer(s), from about 0.05 wt % to about 0.1 wt % biocide(s), and a balance of water.

In some examples, the colored ink composition includes cyan ink composition (C), yellow ink composition (Y), magenta ink composition (M), and black ink composition (K). In some examples, additional ink compositions may be used in addition to the CYMK colored ink composition.

The colorant(s) in the colored ink composition(s) described herein can include inorganic pigments, organic pigments, dyes, and combinations thereof.

The pigment may be any color, including, as examples, a cyan pigment, a magenta pigment, a yellow pigment, a black pigment, a violet pigment, a green pigment, a brown pigment, an orange pigment, a purple pigment, a white pigment, a metallic pigment (e.g., a gold pigment, a bronze pigment, a silver pigment, or a bronze pigment), a pearlescent pigment, or combinations thereof.

In some examples, the colored ink composition includes cyan ink, yellow ink, magenta ink, and black ink.

Examples of suitable yellow organic pigments include C.I. Pigment Yellow 1, C.I. Pigment Yellow 2, C.I. Pigment Yellow 3, C.I. Pigment Yellow 4, C.I. Pigment Yellow 5, C.I. Pigment Yellow 6, C.I. Pigment Yellow 7, C.I. Pigment Yellow 10, C.I. Pigment Yellow 11, C.I. Pigment Yellow 12, C.I. Pigment Yellow 13, C.I. Pigment Yellow 14, C.I. Pigment Yellow 16, C.I. Pigment Yellow 17, C.I. Pigment Yellow 24, C.I. Pigment Yellow 34, C.I. Pigment Yellow 35, C.I. Pigment Yellow 37, C.I. Pigment Yellow 53, C.I. Pigment Yellow 55, C.I. Pigment Yellow 65, C.I. Pigment Yellow 73, C.I. Pigment Yellow 74, C.I. Pigment Yellow 75, C.I. Pigment Yellow 77, C.I. Pigment Yellow 81, C.I. Pigment Yellow 83, C.I. Pigment Yellow 93, C.I. Pigment Yellow 94, C.I. Pigment Yellow 95, C.I. Pigment Yellow 97, C.I. Pigment Yellow 98, C.I. Pigment Yellow 99, C.I. Pigment Yellow 108, C.I. Pigment Yellow 109, C.I. Pigment Yellow 110, C.I. Pigment Yellow 113, C.I. Pigment Yellow 114, C.I. Pigment Yellow 117, C.I. Pigment Yellow 120, C.I. Pigment Yellow 122, C.I. Pigment Yellow 124, C.I. Pigment Yellow 128, C.I. Pigment Yellow 129, C.I. Pigment Yellow 133, C.I. Pigment Yellow 138, C.I. Pigment Yellow 139, C.I. Pigment Yellow 147, C.I. Pigment Yellow 151, C.I. Pigment Yellow 153, C.I. Pigment Yellow 154, C.I. Pigment Yellow 167, C.I. Pigment Yellow 172, C.I. Pigment Yellow 180, and C.I. Pigment Yellow 185.

Examples of suitable blue or cyan organic pigments include C.I. Pigment Blue 1, C.I. Pigment Blue 2, C.I. Pigment Blue 3, C.I. Pigment Blue 15, Pigment Blue 15:3, C.I. Pigment Blue 15:34, C.I. Pigment Blue 15:4, C.I. Pigment Blue 16, C.I. Pigment Blue 18, C.I. Pigment Blue 22, C.I. Pigment Blue 25, C.I. Pigment Blue 60, C.I. Pigment Blue 65, C.I. Pigment Blue 66, C.I. Vat Blue 4, and C.I. Vat Blue 60.

Examples of suitable magenta, red, or violet organic pigments include C.I. Pigment Red 1, C.I. Pigment Red 2, C.I. Pigment Red 3, C.I. Pigment Red 4, C.I. Pigment Red 5, C.I. Pigment Red 6, C.I. Pigment Red 7, C.I. Pigment Red 8, C.I. Pigment Red 9, C.I. Pigment Red 10, C.I. Pigment Red 11, C.I. Pigment Red 12, C.I. Pigment Red 14, C.I. Pigment Red 15, C.I. Pigment Red 16, C.I. Pigment Red 17, C.I. Pigment Red 18, C.I. Pigment Red 19, C.I. Pigment Red 21, C.I. Pigment Red 22, C.I. Pigment Red 23, C.I. Pigment Red 30, C.I. Pigment Red 31, C.I. Pigment Red 32, C.I. Pigment Red 37, C.I. Pigment Red 38, C.I. Pigment Red 40, C.I. Pigment Red 41, C.I. Pigment Red 42, C.I. Pigment Red 48(Ca), C.I. Pigment Red 48(Mn), C.I. Pigment Red 57(Ca), C.I. Pigment Red 57:1, C.I. Pigment Red 88, C.I. Pigment Red 112, C.I. Pigment Red 114, C.I. Pigment Red 122, C.I. Pigment Red 123, C.I. Pigment Red 144, C.I. Pigment Red 146, C.I. Pigment Red 149, C.I. Pigment Red 150, C.I. Pigment Red 166, C.I. Pigment Red 168, C.I. Pigment Red 170, C.I. Pigment Red 171, C.I. Pigment Red 175, C.I. Pigment Red 176, C.I. Pigment Red 177, C.I. Pigment Red 178, C.I. Pigment Red 179, C.I. Pigment Red 184, C.I. Pigment Red 185, C.I. Pigment Red 187, C.I. Pigment Red 202, C.I. Pigment Red 209, C.I. Pigment Red 219, C.I. Pigment Red 224, C.I. Pigment Red 245, C.I. Pigment Red 286, C.I. Pigment Violet 19, C.I. Pigment Violet 23, C.I. Pigment Violet 32, C.I. Pigment Violet 33, C.I. Pigment Violet 36, C.I. Pigment Violet 38, C.I. Pigment Violet 43, and C.I. Pigment Violet 50.

Examples of carbon black pigments include those manufactured by Mitsubishi Chemical Corporation, Japan (such as, e.g., carbon black No. 2300, No. 900, MCF88, No. 33, No. 40, No. 45, No. 52, MA7, MA8, MA100, and No. 2200B); various carbon black pigments of the RAVEN® series manufactured by Columbian Chemicals Company, Marietta, Ga., (such as, e.g., RAVEN® 5750, RAVEN® 5250, RAVEN® 5000, RAVEN® 3500, RAVEN® 1255, and RAVEN® 700); various carbon black pigments of the BLACK PEARLS® series, REGAL® series, the MOGUL® series, or the MONARCH® series manufactured by Cabot Corporation, Boston, Mass., (such as, e.g., BLACK PEARLS® 880 Carbon Black, REGAL® 400R, REGAL® 330R, and REGAL® 660R); and various black pigments manufactured by Evonik Degussa Corporation, Parsippany, N.J., (such as, e.g., Color Black FW1, Color Black FW2, Color Black FW2V, Color Black FW18, Color Black FW200, Color Black S150, Color Black S160, Color Black S170, PRINTEX® 35, PRINTEX® U, PRINTEX® V, PRINTEX® 140U, Special Black 5, Special Black 4A, and Special Black 4). An example of an organic black pigment includes aniline black, such as C.I. Pigment Black 1.

Some examples of green organic pigments include C.I. Pigment Green 1, C.I. Pigment Green 2, C.I. Pigment Green 4, C.I. Pigment Green 7, C.I. Pigment Green 8, C.I. Pigment Green 10, C.I. Pigment Green 36, and C.I. Pigment Green 45.

Examples of brown organic pigments include C.I. Pigment Brown 1, C.I. Pigment Brown 5, C.I. Pigment Brown 22, C.I. Pigment Brown 23, C.I. Pigment Brown 25, C.I. Pigment Brown 41, and C.I. Pigment Brown 42.

Some examples of orange organic pigments include C.I. Pigment Orange 1, C.I. Pigment Orange 2, C.I. Pigment Orange 5, C.I. Pigment Orange 7, C.I. Pigment Orange 13, C.I. Pigment Orange 15, C.I. Pigment Orange 16, C.I. Pigment Orange 17, C.I. Pigment Orange 19, C.I. Pigment Orange 24, C.I. Pigment Orange 34, C.I. Pigment Orange 36, C.I. Pigment Orange 38, C.I. Pigment Orange 40, C.I. Pigment Orange 43, and C.I. Pigment Orange 66.

A suitable metallic pigment includes a metal chosen from gold, silver, platinum, nickel, chromium, tin, zinc, indium, titanium, copper, aluminum, and alloys of any of these metals. These metals may be used alone or in combination with two or more metals or metal alloys. Some examples of metallic pigments include STANDART® R0100, STANDART® R0200, and DORADO® gold-bronze pigments (available from Eckart Effect Pigments, Wesel, Germany).

In some examples, the above pigments can be used alone or in any combination with one another.

The total amount of the colorant(s) in the colored ink composition(s) ranges from about 0.1 wt % to about 15 wt % based on the total weight of the colored ink composition(s). In some examples, the total amount of the colorant(s) in the colored ink composition(s) ranges from about 1 wt % to about 8 wt % based on the total weight of the colored ink composition(s).

In some examples, the average particle size of these colorant(s) may range from about 80 nm to about 400 nm.

In some examples, the above-described colorant(s) can be dispersed into a polymeric dispersion. In some examples, the colorant(s) (e.g., pigment(s)) can be dispersed in a dispersion comprising a styrene acrylic polymer. The polymeric dispersion comprising a styrene acrylic polymer can assist in dispersing the pigment in a solvent system.

A variety of styrene acrylic polymers can be used for the pigment dispersion. Some non-limiting commercial examples of useful styrene acrylic polymers are sold under the trade names JONCRYL® (S.C. Johnson Co.), UCAR™ (Dow Chemical Co.), JONREZ® (MeadWestvaco Corp.), and VANCRYL® (Air Products and Chemicals, Inc.).

In further detail, the styrene acrylic polymer can be formulated with a variety of monomers, such as hydrophilic monomers, hydrophobic monomers, or combinations thereof. Non-limiting examples of hydrophilic monomers that can be co-polymerized together to form the styrene acrylic polymer include acrylic acid, methacrylic acid, ethacrylic acid, dimethylacrylic acid, maleic anhydride, maleic acid, vinylsulfonate, cyanoacrylic acid, vinylacetic acid, allylacetic acid, ethylidineacetic acid, propylidineacetic acid, crotonoic acid, fumaric acid, itaconic acid, sorbic acid, angelic acid, cinnamic acid, styrylacrylic acid, citraconic acid, glutaconic acid, aconitic acid, phenylacrylic acid, acryloxypropionic acid, aconitic acid, phenylacrylic acid, acryloxypropionic acid, vinylbenzoic acid, N-vinylsuccinamidic acid, mesaconic acid, methacroylalanine, acryloylhydroxyglycine, sulfoethyl methacrylic acid, sulfopropyl acrylic acid, styrene sulfonic acid, sulfoethylacrylic acid, 2-methacryloyloxymethane-1-sulfonic acid, 3-methacryoyloxypropane-1-sulfonic acid, 3-(vinyloxy)propane-1-sulfonic acid, ethylenesulfonic acid, vinyl sulfuric acid, 4-vinylphenyl sulfuric acid, ethylene phosphonic acid, vinyl phosphoric acid, vinyl benzoic acid, 2-acrylamido-2-methyl-1-propanesulfonic acid, the like, or combinations thereof.

Non-limiting examples of hydrophobic monomers that can be used include styrene, p-methyl styrene, methyl methacrylate, hexyl acrylate, hexyl methacrylate, butyl acrylate, butyl methacrylate, ethyl acrylate, ethyl methacrylate, propyl acrylate, propyl methacrylate, octadecyl acrylate, octadecyl methacrylate, stearyl methacrylate, vinylbenzyl chloride, isobornyl acrylate, tetrahydrofurfuryl acrylate, 2-phenoxyethyl methacrylate, ethoxylated nonyl phenol methacrylate, isobornyl methacrylate, cyclohexyl methacrylate, t-butyl methacrylate, n-octyl methacrylate, lauryl methacrylate, trydecyl methacrylate, alkoxylated tetrahydrofurfuryl acrylate, isodecyl acrylate, isobornylmethacrylate, the like, or combinations thereof.

The styrene acrylic polymer can have a weight average molecular weight (Mw) from about 3,000 g/mol to about 30,000 g/mol. In yet other examples, the styrene acrylic polymer can have an Mw from about 4,000 g/mol to about 25,000 g/mol, or from about 4,500 g/mol to about 22,000 g/mol.

In each instance where molecular weight is referred to, it is to be understood that this refers to weight average molecular weight in g/mol.

Further, in some examples, the styrene acrylic polymer can have an acid number or acid value from about 120 mg KOH/g to about 300 mg KOH/g. In yet other examples, the styrene acrylic polymer can have an acid number from about 140 mg KOH/g to about 260 mg KOH/g, from about 160 mg KOH/g to about 240 mg KOH/g, or from about 180 mg KOH/g to about 230 mg KOH/g. An acid number can be defined as the number of milligrams of potassium hydroxide to neutralize 1 gram of the substance.

In some examples, the amount of styrene acrylic polymer in the colored ink composition(s) can be from about 0.1 wt % to about 20 wt % based on the total weight of the colored ink composition(s), or from about 0.5 wt % to about 10 wt % based on the total weight of the colored ink composition(s), or from about 1 wt % to about 5 wt % based on the total weight of the colored ink composition(s).

In some examples, the amount of styrene acrylic polymer in the colored ink composition(s) can be based on the amount of the colorant(s) in the colored ink composition(s). Thus, in some examples, the colorant(s) and the styrene acrylic polymer can be present in the colored ink composition(s) at a particular weight ratio. In some specific examples, the pigment and styrene acrylic polymer can be present at a weight ratio of from 1:1 to 10:1. In other examples, the pigment and the styrene acrylic polymer can be present at a weight ratio of from about 2:1 to about 10:1. In yet other examples, the pigment and the styrene acrylic polymer can be present at a weight ratio of from about 3:1 to about 6:1.

Detailing Agent

In some examples, the three-dimensional printing methods and compositions described herein include a detailing agent. The detailing agent comprises: at least one co-solvent; at least one surfactant; at least one anti-kogation agent; at least one chelating agent; at least one biocide; and water.

In some examples, the detailing agent can further include other additives including at least one buffer solution, at least one dispersant, at least one stabilizer, and/or combinations thereof.

In some examples, the detailing agent is added in the three-dimensional printing composition in an amount of from about 1 wt % to about 30 wt % based on the total weight of the three-dimensional printing composition, or from about 5 wt % to about 25 wt %, or from about 8 wt % to about 20 wt %, or less than about 35 wt %, or less than about 25 wt %, or less than about 20 wt %, or less than about 15 wt %, or less than about 10 wt %, or at least about 1 wt %, or at least about 3 wt %, or at least about 5 wt %, or at least about 8 wt %, or at least about 10 wt %, or at least about 15 wt %, or at least about 20 wt %, or at least about 30 wt %, or at least about 35 wt %.

Co-Solvent(s)

In some examples, each of the agent(s)/composition(s) described herein can include at least one co-solvent. The co-solvent can be present in an amount ranging from about 0.1 wt % to about 50 wt % based on the total weight of each of the agent(s)/composition(s), or less than about 60 wt %, or less than about 50 wt %, or less than about 45 wt %, or less than about 40 wt %, or less than about 35 wt %, or less than about 30 wt %, or less than about 25 wt %, or less than about 20 wt %, or less than about 15 wt %, or less than about 10 wt %, or less than about 5 wt %, or at least about 10 wt %, or at least about 15 wt %, or at least about 20 wt %, or at least about 25 wt %, or at least about 30 wt %, or at least about 35 wt %, or at least about 40 wt %, or at least about 45 wt %, or at least about 50 wt %.

Some examples of co-solvents can include 2-pyrrolidinone, hydroxyethyl-2-pyrrolidone, diethylene glycol, 2-methyl-1,3-propanediol, tetraethylene glycol, tripropylene glycol methyl ether, dipropylene glycol methyl ether, tripropylene glycol butyl ether, dipropylene glycol butyl ether, triethylene glycol butyl ether, 1,2-hexanediol, 2-hydroxyethyl pyrrolidinone, 2-hydroxyethyl-2-pyrrolidinone, 1,6-hexanediol, and combinations thereof.

Additive(s)

In some examples, the agent(s)/composition(s) may further include a buffer solution, a surfactant, a dispersant, an anti-kogation agent, a dispersing additive, a biocide, a chelating agent, at least one chelating agent, and combinations thereof.

In some examples, the agent(s)/composition(s) may further include buffer solution(s). In some examples, the buffer solution(s) can withstand small changes (e.g., less than 1) in pH when small quantities of a water-soluble acid or a water-soluble base are added to a composition containing the buffer solution(s). The buffer solution(s) can have pH ranges from about 5 to about 9.5, or from about 7 to about 9, or from about 7.5 to about 8.5.

In some examples, the buffer solution(s) can be added to the agent(s)/composition(s) in amounts ranging from about 0.01 wt % to about 20 wt %, or from 0.1 wt % to about 15 wt %, or from about 0.1 wt % to about 10 wt % based on the total weight of the agent(s)/composition(s).

In some examples, the buffer solution(s) can include at least one poly-hydroxy functional amine.

In some examples, the buffer solution(s) can be 2-[4-(2-hydroxyethyl) piperazin-1-yl] ethane sulfonic acid, 2-amino-2-(hydroxymethyl)-1,3-propanediol (TRIZMA® sold by Sigma-Aldrich), 3-morpholinopropanesulfonic acid, triethanolamine, 2-[bis-(2-hydroxyethyl)-amino]-2-hydroxymethyl propane-1,3-diol (bis tris methane), N-methyl-D-glucamine, N,N,N'N'-tetrakis-(2-hydroxyethyl)-ethylenediamine and N,N,N'N'-tetrakis-(2-hydroxypropyl)-ethylenediamine, beta-alanine, betaine, or mixtures thereof.

In some examples, the buffer solution(s) can be 2-amino-2-(hydroxymethyl)-1,3-propanediol (TRIZMA® sold by Sigma-Aldrich), beta-alanine, betaine, or mixtures thereof.

The agent(s)/composition(s) in some examples can be dispersed with a dispersing additive. The dispersing additive can help to uniformly distribute colorant(s) throughout the agent(s)/composition(s). The dispersing additive may also aid in the wetting of the agent(s)/composition(s) onto any other applied agent(s)/composition(s) and/or the layer(s) of the build material.

The dispersing additive may be present in the agent(s)/composition(s) in an amount ranging from about 0.01 wt % to about 2 wt % based on the total weight of the agent(s)/composition(s), or less than about 1.5 wt %, or less than about 1 wt %, or at least 0.01 wt %, or at least about 0.1 wt %, or at least about 0.5 wt %.

Some examples of the dispersing additive can include a water soluble acrylic acid polymer (e.g., CARBOSPERSE® K7028 available from Lubrizol), a high molecular weight block copolymer with pigment affinic groups (e.g., DISPERBYK®-190 available BYK Additives and Instruments), and combinations thereof.

The agent(s)/composition(s) can further include the dispersant to provide particular wetting properties when applied to the layer(s) of the build material. The dispersant can help uniformly distribute the ink(s) on the layer(s) of the build material.

The dispersant may be present in the agent(s)/composition(s) in an amount ranging from about 0.01 wt % to about 2 wt % based on the total weight of the agent(s)/composition(s), or less than about 1.5 wt %, or less than about 1 wt %, or at least 0.01 wt %, or at least about 0.1 wt %, or at least about 0.5 wt %.

The dispersant may be non-ionic, cationic, anionic, or combinations thereof. Some examples of the dispersant include a self-emulsifiable, non-ionic wetting agent based on acetylenic diol chemistry (e.g., SURFYNOL® SEF from Air Products and Chemicals, Inc.), an ethoxylated low-foam wetting agent (e.g., SURFYNOL® 440 and SURFYNOL® 465 from Air Products and Chemicals, Inc.), a non-ionic acetylenic diol surface active agent (e.g., SURFYNOL® 104 from Air Products and Chemicals, Inc.), a non-ionic, alkylphenylethoxylate and solvent free surfactant blend (e.g., SURFYNOL® CT-211 from Air Products and Chemicals, Inc.), a non-ionic organic surfactant (e.g., TEGO® Wet 510 from Evonik Industries AG), a non-ionic fluorosurfactant (e.g., CAPSTONE® fluorosurfactants from DuPont, previously known as ZONYL FSO, POLYFOX™ PF-154N from Omnova Solutions Inc.), non-ionic a secondary alcohol ethoxylate (e.g., TERGITOL® 15-S-5, TERGITOL® 15-S-7, TERGITOL® 15-S-9, and TERGITOL® 15-S-30 all from Dow Chemical Company), a water-soluble non-ionic surfactant (e.g., TERGITOL® TMN-6), and combinations thereof. Examples of anionic dispersants include those in the DOWFAX™ family (from Dow Chemical Company), and examples of cationic dispersants include dodecyltrimethylammonium chloride and hexadecyldimethylammonium chloride. Combinations of any of the previously listed dispersants may also be used.

Examples of anti-kogation agents include oleth-3-phosphate or polyoxyethyene (3) oleyl mono/di-phosphate (e.g., CRODAFOS® N-3A from Croda, now CRODAFOS® O3A), aqueous dispersion of fumed alumina or fumed silica (e.g., CAB—O-SPERSE® from Cabot Corp.), a metal chelator/chelating agent, such as methylglycinediacetic acid (e.g., TRILON® M from BASF Corp.), and combinations thereof.

The anti-kogation agents may be present in the agent(s)/composition(s) in an amount ranging from about 0.01 wt % to about 2 wt % based on the total weight of the agent(s)/composition(s), or less than about 1.5 wt %, or less than about 1 wt %, or at least 0.01 wt %, or at least about 0.1 wt %, or at least about 0.5 wt %.

Examples of biocides include 1,2-benzisothiazolin-3-one as the active ingredient in ACTICIDE® B-20 (available from Thor GmbH), 2-methyl-4-isothiazolin-3-one as the active ingredient in ACTICIDE® M-20 (available from Thor GmbH), an aqueous solution of 1,2-benzisothiazolin-3-one (e.g., PROXEL® GXL from Arch Chemicals, Inc.), quaternary ammonium compounds (e.g., BARDAC® 2250 and 2280, BARQUAT® 50-65B, and CARBOQUAT® 250-T, all from Lonza Ltd. Corp.), an aqueous solution of methylisothiazolone (e.g., KORDEK® MLX from The Dow Chemical Co.), and combinations thereof.

The biocides may be present in the agent(s)/composition(s) in an amount ranging from about 0.01 wt % to about 2 wt % based on the total weight of the agent(s)/composition(s), or less than about 1.5 wt %, or less than about 1 wt %, or at least 0.01 wt %, or at least about 0.1 wt %, or at least about 0.5 wt %.

The agent(s)/composition(s) may also include a binder or other additives, such as a humectant and lubricant (e.g., LIPONIC® EG-1 (LEG-1) from Lipo Chemicals) or a chelating agent (e.g., disodium ethylenediaminetetraacetic acid (EDTA-Na)).

The amounts of the above additives in the first fusing agent, the second fusing agent, the color ink composition, and the detailing agent can total up to about 20 wt % based on the total weight of one of the agent(s)/composition(s).

Water

The balance of the agent(s) and composition(s) is water. As such, the amount of water may vary depending upon the amounts of the nanoparticle(s), near infrared absorbing compound(s), and colorant(s).

In some examples, water can be present in the agent(s)/composition(s) in amounts greater than about 50 wt % based on the total weight of the agent(s)/composition(s). In some examples, the water can be present in the agent(s)/composition(s) in amounts from about 50 wt % to about 90 wt % based on the total weight of the agent(s)/composition(s). In other examples, the agent(s)/composition(s) can include water in an amount of from about 60 wt % to about 90 wt % based on the total weight of the agent(s)/composition(s). In further examples, the agent(s)/composition(s) can include from about 70 wt % to about 85 wt % water.

Agent(s)/Composition(s) Preparation

In some examples, the first fusing agent may be prepared by mixing the nanoparticles described above, a co-solvent, water.

In some examples, the second fusing agent may be prepared by mixing the near infrared absorbing compound described above, a co-solvent, water.

In some examples, the color ink composition may be prepared by mixing water, a co-solvent, and one or more colorant(s) dispersed in a binder solution.

In some examples, the detailing agent may be prepared by mixing the a co-solvent and water.

In some examples, the first fusing agent, the second fusing agent, the color ink composition, and the detailing agent can further be mixed with one or more of the additives described above.

In some examples, the first fusing agent may be filtered to obtain the nanoparticle aqueous ink composition used in the 3D printing methods described herein.

In some examples, the colored ink(s) may be prepared by first milling any colorant(s) in water and a dispersant additive until a particle size of from about 0.01 nm to about 1000 nm of the colorant is obtained. Milling forms a colorant concentrate.

A balance of water may be added to the agent(s)/composition(s) in a suitable amount, taking into account the weight percent of colorant concentrate that is to be added.

Build Material

In some examples, the powder build material 206 can be selected from the group consisting of polymeric powder, polymeric-ceramic composite powder, and combinations thereof.

In some examples, the build material may be a polymeric build material. As used herein, the term "polymeric build material" may refer to crystalline or semi-crystalline polymer particles or composite particles made up of polymer and ceramic. Any of the particles may be in powder form. Examples of semi-crystalline polymers include semi-crystalline thermoplastic materials with a wide processing window of greater than 5° C. (i.e., the temperature range between the melting point and the re-crystallization temperature). Some specific examples of the semi-crystalline thermoplastic materials include polyamides (PAs) (e.g., PA 11/nylon 11, PA 12/nylon 12, PA 6/nylon 6, PA 8/nylon 8, PA 9/nylon 9, PA 66/nylon 66, PA 612/nylon 612, PA 812/nylon 812, PA 912/nylon 912, etc.).

Other examples of crystalline or semi-crystalline polymers suitable for use as the build material particles include polyethylene, polyethylene oxide, polypropylene, polyoxomethylene (i.e., polyacetals), and combinations thereof. Still other examples of suitable build material particles include polystyrene, polycarbonate, polyester, polyurethanes, other engineering plastics, and combinations thereof. It should be noted that the "combinations" of the polymers described herein can include blends, mixtures, block copolymers, random copolymers, alternating copolymers, periodic polymers, and mixtures thereof.

In some examples, the build material may be a polymeric-ceramic composite powder. The "polymeric-ceramic composite" powder can include one or more of the polymers described above in combination with one or more ceramic materials in the form of a composite. The polymeric-ceramic composite can include any weight combination of polymeric material and ceramic material. For example, the polymeric material can be present in an amount of up to 99 wt % with the balance being ceramic material or the ceramic material can be present in an amount of up to 99 wt % with the balance being polymeric material.

In some examples, the ceramic material can be selected from the group consisting of silica, fused silica, quartz, alumina silicates, magnesia silicates, boria silicates, and mixtures thereof. Examples of ceramic materials can include metal oxides, inorganic glasses, carbides, nitrides, and borides. Some specific examples can include alumina (Al2O3), Na2O/CaO/SiO2glass (soda-lime glass), silicon nitride (Si3N4), silicon dioxide (SiO2), zirconia (ZrO2), titanium dioxide (TiO2), glass frit materials, or combinations thereof. As an example of one suitable combination, 30 wt % glass may be mixed with 70 wt % alumina.

The polymeric material or the polymeric-ceramic composite material may be made up of similarly sized particles or differently sized particles. The term "size" or "particle size," as used herein, refers to the diameter of a substantially spherical particle, or the average diameter of a non-spherical particle (i.e., the average of multiple diameters across the particle), or the effective diameter of a non-spherical particle (i.e., the diameter of a sphere with the same mass and density as the non-spherical particle). A substantially spherical particle (i.e., spherical or near-spherical) has a sphericity of >0.84. Thus, any individual particles having a sphericity of <0.84 are considered non-spherical (irregularly shaped).

In some examples, the particle size of the polymeric material or the polymeric-ceramic composite material particles can be from about 10 μm to about 500 μm, or less than about 450 μm, or less than about 400 μm, or less than about 350 μm, or less than about 300 μm, or less than about 250 μm, or less than about 200 μm, or less than about 150 μm, or less than about 150 μm, or less than about 90 μm, or less than about 80 μm, or at least about 10 μm, or at least about 20 μm, or at least about 30 μm, or at least about 40 μm, or at least about 50 μm, or at least about 60 μm, or at least about 70 μm, or at least about 80 μm, or at least about 90 μm, or at least about 100 μm, or at least about 110 μm, or at least about 120 μm, or at least about 130 μm, or at least about 140 μm, or at least about 150 μm, or at least about 160 μm, or at least about 170 μm, or at least about 180 μm, or at least about 190 μm.

The build material particles may have a melting point or softening point ranging from about 50° C. to about 400° C. As an example, the build material particles may be a polyamide having a melting point of 180° C. The build material particles may be made up of similarly sized particles or differently sized particles. The term "size", as used herein with regard to the build material particles, refers to the diameter of a spherical particle, or the average diameter of a non-spherical particle (i.e., the average of multiple diameters across the particle), or the volume-weighted mean diameter of a particle distribution.

In some examples, the build material can include one or more fillers. The fillers can be selected from glass beads, fumed silica, natural or synthetic fibers, glass fibers, carbon fibers, boron fibers, Kevlar® fiber, PTFE fiber, ceramic fibers, silicon carbide fibers, alumina fiber, and combinations thereof. In some examples, the filler can include inorganic oxides, carbides, borides and nitrides having a Knoop hardness of at least 1200. In some examples, the filler are inorganic oxides, nitrides, borides and carbides of zirconium, tantalum, titanium, tungsten, boron, aluminum and beryllium. In some examples, the filler is silicon carbide and aluminum oxide.

The fillers can be added to the build material in an amount of up to about 30 wt % based on the total amount of the build material, or less than about 25 wt %, or less than about 20 wt %, or less than about 15 wt %, or less than about 10 wt %.

3D Printed Part/Object

The present disclosure refers also to an article, or final 3D object, that has been obtained according to three-dimensional printing methods described herein.

The 3D printed article can comprise a core substrate made of a polymeric build material that has been fused with a second fusing agent composition; a first layer applied on the surface of the core substrate, comprising a polymeric build material fused with a first fusing agent composition including metal oxide nanoparticles dispersed in a liquid vehicle or fused with second fusing agent; and a second layer comprising a polymeric build material fused with a colored ink composition and with a first fusing agent. In some other examples, the 3D printed article can further comprise a third layer comprising a colored ink composition. In some other examples, the 3D printed article can further comprise a fourth layer comprising a detailing agent.

The core layer might be considered as providing the mechanical integrity of the final 3D object. Due to the chemical nature of the second fusing agent it contains, the core layer might have a black color. The first layer could be defined as a transition layer that would match lightness of the target color. The first layer can provide the object with a white (or slightly tinted) exterior surface. The first layer can also have the effect to optically isolate the core layer that it covers. The second layer and the third layer (when present) would provide color to the final object and can also be thus referred to as the "colored layer". The color would be provided by the colorant contained in the ink composition.

It is to be understood that the final 3D object is made layer by layer, the layers are stacked over each other i.e., by depositing one layer over the other. This means thus that the core layer (or substrate) is not necessarily built first, but the external layer or second layers might be built first. The layer that is formed with the second fusing agent composition may be a first or primer layer (upon which other layers are formed) or may be an outer layer (or one of several layers forming an outer region) of the part that is formed.

The article of final 3D object is made several layers and each layer is made of several parts. Each layer is sequentially formed by selectively patterning respective build material layers with the first fusing agent and first fusing agent, depending of the nature of the part wanted, and exposing each patterned layer to electromagnetic radiation. In some examples, each layer can have a different but substantially uniform thickness. In an example, the thickness of each layer in the part can range from about 10 μm to about 500 μm, although thinner or thicker layers may also be used. In some other examples, the thickness of the core layer can range from about 500 μm to about 1 cm, although thinner or thicker layers may also be used.

Unless otherwise stated, any feature described hereinabove can be combined with any example or any other feature described herein.

In describing and claiming the examples disclosed herein, the singular forms "a," "an," and "the" include plural referents unless the context clearly dictates otherwise.

It is to be understood that concentrations, amounts, and other numerical data may be expressed or presented herein in range formats. It is to be understood that such range formats are used merely for convenience and brevity and thus should be interpreted flexibly to include not just the numerical values explicitly recited as the end points of the range, but also to include all the individual numerical values or sub-ranges encompassed within that range as if each numerical value and sub-range is explicitly recited. As an illustration, a numerical range of "about 1 wt % to about 5 wt %" should be interpreted to include not just the explicitly recited values of about 1 wt % to about 5 wt %, but also include individual values and subranges within the indicated range. Thus, included in this numerical range are individual values such as 2, 3.5, and 4 and sub-ranges such as from 1-3, from 2-4, and from 3-5, etc. This same applies to ranges reciting a single numerical value.

Reference throughout the specification to "one example," "some examples," "another example," "an example," and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

Unless otherwise stated, references herein to "wt %" of a component are to the weight of that component as a percentage of the whole composition comprising that component. For example, references herein to "wt %" of, for example, a solid material such as polyurethane(s) or colorant(s) dispersed in a liquid composition are to the weight percentage of those solids in the composition, and not to the amount of that solid as a percentage of the total non-volatile solids of the composition.

If a standard test is mentioned herein, unless otherwise stated, the version of the test to be referred to is the most recent at the time of filing this patent application.

All amounts disclosed herein and in the examples below are in wt % unless indicated otherwise.

To further illustrate the present disclosure, examples are given herein. It is to be understood that these examples are provided for illustrative reasons and are not to be construed as limiting the scope of the present disclosure.

EXAMPLES

Example 1

The following Table 1 shows an example first fusing agent composition.

TABLE 1

| Component | Comp. A (wt %) |
|---|---|
| Near Infrared Absorber | 5-12 |
| Organic Solvent | 15-25 |
| Surfactant | 0.1-5 |
| Biocide | 0.01-0.1 |
| Complexing Agent | 0.001-0.01 |
| water | Balance |

Example 2

The following Table 2 shows an example second fusing agent composition.

TABLE 2

| Component | Comp. B (wt %) |
|---|---|
| Organic Solvent | 20-35 |
| Surfactant | 1-5 |
| Anti-kogation agent and chelating agent | 0.1-1 |
| Biocide | 0.1-1 |
| Near IR Absorbing Agent | 3-8 |
| Water | Balance |

Example 3

The following Table 3 shows an example detailing agent composition.

TABLE 3

| Component | Comp. C (wt %) |
|---|---|
| Organic Solvent | 10-20 |
| Surfactant | 0.5-1 |
| Anti-kogation agent and chelating agent | 0.1-1 |
| Biocide | 0.1-1 |
| Colorant(s) | 0-10 |
| Water | Balance |

Example 4

The following Tables 4-7 show examples of cyan ink, yellow ink, magenta ink, and black ink compositions.

TABLE 4

| Component | Comp. D (wt %) |
|---|---|
| Cyan Colorant | 1-10 |
| Organic Solvent | 30-60 |
| Anti-Kogation Agent | 0.01-0.05 |
| Buffering Agent | 0.1-0.5 |
| Dispersant | 0-0.1 |

TABLE 4-continued

| Component | Comp. D (wt %) |
|---|---|
| Surfactant | 0.1-1 |
| Biocide | 0-0.1 |
| Chelating Agent | 0.01-0.1 |
| Water | balance |

TABLE 5

| Component | Comp. E (wt %) |
|---|---|
| Yellow Colorant | 1-10 |
| Organic Solvent | 30-60 |
| Anti-Kogation Agent | 0-0.05 |
| Buffering Agent | 0.05-0.5 |
| Dispersant | 0-0.1 |
| Surfactant | 0.1-1 |
| Biocide | 0-0.1 |
| Chelating Agent | 0.01-0.1 |
| Water | balance |

TABLE 6

| Component | Comp. F (wt %) |
|---|---|
| Magenta Colorant | 1-10 |
| Organic Solvent | 30-60 |
| Anti-Kogation Agent | 0.01-0.5 |
| Buffering Agent | 0.05-0.5 |
| Dispersant | 0-0.1 |
| Surfactant | 0.1-1 |
| Biocide | 0-0.1 |
| Chelating Agent | 0.01-0.1 |
| Water | balance |

TABLE 7

| Component | Comp. G |
|---|---|
| Black Colorant | 1-10 |
| Oxidizer/Colorfastness | 1-5 |
| Organic Solvent | 30-60 |
| Anti-Kogation Agent | 0-0.1 |
| Buffering Agent | 0.05-0.5 |
| Surfactant | 0.1-1 |
| Biocide | 0-0.1 |
| Chelating Agent | 0.01-0.1 |
| Water | balance |

Although described specifically throughout the entirety of the instant disclosure, representative examples of the present disclosure have utility over a wide range of applications, and the above discussion is not intended and should not be construed to be limiting, but is offered as an illustrative discussion of examples of the disclosure.

What is claimed is:

1. A composition for three-dimensional printing comprising:
(A) a powder build material;
(B) a first fusing agent;
(C) a second fusing agent different from the first fusing agent;
(D) a detailing agent;
(E) a cyan ink composition;
(F) a yellow ink composition;
(G) a magenta ink composition; and
(H) a black ink composition, wherein the first fusing agent comprises at least one nanoparticle, wherein the nanoparticle comprises at least one metal oxide, which absorbs infrared light in a range of from about 780 nm to about 2300 nm and is shown in formula (1):

$$M_m M'O_n \quad (1)$$

wherein M is an alkali metal, m is greater than 0 and less than 1, M' is any metal, and n is greater than 0 and less than or equal to 4; and
wherein the nanoparticle has a diameter of from about 0.1 nm to about 500 nm.

2. The composition of claim 1, wherein M is cesium (Cs), m is 0.33, M' is tungsten (W), and n is greater than 0 and less than or equal to 3.

3. The composition of claim 1, wherein the detailing agent comprises:
at least one co-solvent;
at least one surfactant;
at least one anti-kogation agent;
at least one chelating agent;
at least one biocide; and
water.

4. The composition of claim 1, wherein the first fusing agent comprises:
at least one co-solvent;
at least one anti-kogation agent;
at least one surfactant;
at least one biocide;
at least one pigment stabilizer;
at least one complexing agent; and
water.

5. The composition of claim 1, wherein
(E) the cyan ink composition comprises:
at least one cyan colorant,
at least one co-solvent,
at least one anti-kogation agent,
at least one buffer solution,
at least one surfactant,
at least one biocide,
at least one chelating agent, and
water;
(F) the yellow ink composition comprises:
at least one yellow colorant,
at least one co-solvent,
at least one anti-kogation agent,
at least one buffer solution,
at least one surfactant,
at least one biocide,
at least one chelating agent, and
water;
(G) the magenta ink composition comprises:
at least one magenta colorant,
at least one co-solvent,
at least one anti-kogation agent,
at least one buffer solution,
at least one surfactant,
at least one biocide,
at least one chelating agent, and
water; and
(H) the black ink composition comprises:
at least one black colorant,
at least one co-solvent,
at least one anti-kogation agent,
at least one buffer solution,
at least one surfactant,
at least one biocide,
at least one chelating agent, and
water.

6. The composition of claim 1, wherein the powder build material is selected from the group consisting of polymeric powder, polymer-ceramic composite powder, and combinations thereof.

7. The composition of claim 6, wherein the powder build material comprises fillers selected from the group consisting of silica, alumina, glass, and combinations thereof.

8. The composition of claim 7, wherein the second fusing agent further comprises:
   at least one co-solvent;
   at least one surfactant;
   at least one anti-kogation agent;
   at least one chelating agent;
   at least one buffer solution;
   at least one biocide; and
   water.

9. The composition of claim 1, wherein the second fusing agent comprises a near infrared absorbing compound.

10. The composition of claim 9, wherein the near infrared absorbing compound is selected from the group consisting of carbon black, oxonol, squarylium, chalcogenopyrylarylidene, bis(chalcogenopyrylo)polymelhine, bis(aminoaryl)polymethine, merocyanine, trinuclear cyanine, indene-crosslinked polymethine, oxyindolidine, iron complexes, quinoids, nickel-dithiolene complex, cyanine dyes, and combinations thereof.

11. The composition of claim 10, wherein the near infrared absorbing compound is carbon black.

* * * * *